US010655974B2

United States Patent
Nelson et al.

(10) Patent No.: US 10,655,974 B2
(45) Date of Patent: May 19, 2020

(54) SYSTEM FOR PROVIDING REAL-TIME ROUTING AND DATA SERVICES FOR USER EVENTS BASED ON REAL-TIME VEHICLE LOCATION

(71) Applicant: Bank of America Corporation, Charlotte, NC (US)

(72) Inventors: Mark Allan Nelson, Waxhaw, NC (US); Stephen Philip Selfridge, Huntersville, NC (US); Ashish B. Tajpuria, San Francisco, CA (US); Karen Lea MacQueen, Lyndhurst, OH (US); Steven Michael Twombly, Saco, ME (US)

(73) Assignee: Bank of America Corporation, Charlotte, NC (US)

(*) Notice: Subject to any disclaimer, the term of this patent is extended or adjusted under 35 U.S.C. 154(b) by 242 days.

(21) Appl. No.: 15/986,410

(22) Filed: May 22, 2018

(65) Prior Publication Data

US 2019/0360823 A1 Nov. 28, 2019

(51) Int. Cl.
*G01C 21/34* (2006.01)
*G01C 21/36* (2006.01)
*G06Q 10/10* (2012.01)
*H04W 4/024* (2018.01)

(52) U.S. Cl.
CPC ..... *G01C 21/3415* (2013.01); *G01C 21/3676* (2013.01); *G01C 21/3679* (2013.01); *G06Q 10/107* (2013.01); *G06Q 10/109* (2013.01); *H04W 4/024* (2018.02)

(58) Field of Classification Search
CPC ............ G01C 21/3415; G01C 21/3676; G06C 21/3679; G06Q 10/107; G06Q 10/109; H04W 4/024
See application file for complete search history.

(56) References Cited

U.S. PATENT DOCUMENTS

| 6,873,970 | B2 | 3/2005 | Showghi et al. |
| 8,756,178 | B1 | 6/2014 | Bruckhaus et al. |
| 9,002,328 | B2 | 4/2015 | Aaron |
| 9,292,832 | B2 | 3/2016 | Goel et al. |
| 9,406,084 | B2 | 8/2016 | Havas |

(Continued)

FOREIGN PATENT DOCUMENTS

WO 2016209006 A1 12/2016

*Primary Examiner* — Mary Cheung
(74) *Attorney, Agent, or Firm* — Michael A. Springs; Moore & Van Allen PLLC; Peter B. Stewart

(57) ABSTRACT

A computerized system may be configured for: determining a travel route to an event; causing a display of a smart device of a vehicle of a user to display the travel route; determining a parking location proximate to the event; modifying the travel route to include the parking location; identifying an item of a third party entity located proximate to the event; placing an order for the item in response to determining that a trigger event has occurred; causing a display of the user's mobile device to display information about the order once the vehicle has arrived at the parking location and the user is no longer collocated with the vehicle; determining that the mobile device of the user is collocated with a remote device of the third party entity; and transferring resources from the user to the third party entity to complete the order.

20 Claims, 11 Drawing Sheets

(56) References Cited

U.S. PATENT DOCUMENTS

| | | | |
|---|---|---|---|
| 9,413,827 | B2 | 8/2016 | Sharma et al. |
| 9,438,440 | B2 | 9/2016 | Burns et al. |
| 9,656,805 | B1 * | 5/2017 | Evans ................. G06Q 10/083 |
| 9,680,726 | B2 | 6/2017 | Sharma et al. |
| 9,717,012 | B2 | 7/2017 | Zakaria et al. |
| 9,742,740 | B2 | 8/2017 | Fransen |
| 9,774,497 | B2 | 9/2017 | Britt et al. |
| 9,774,507 | B2 | 9/2017 | Britt et al. |
| 9,800,717 | B2 * | 10/2017 | Ma .................... H04M 1/72577 |
| 9,847,961 | B2 | 12/2017 | Shuman et al. |
| 9,900,171 | B2 | 2/2018 | Guedalia et al. |
| 9,900,172 | B2 | 2/2018 | Goel et al. |
| 10,303,171 | B1 * | 5/2019 | Brady .................... G08G 1/207 |
| 2011/0004485 | A1 | 1/2011 | Sholl et al. |
| 2012/0323690 | A1 * | 12/2012 | Michael ................ G06Q 30/02 705/14.58 |
| 2013/0151357 | A1 | 6/2013 | Havas et al. |
| 2015/0358777 | A1 | 12/2015 | Gupta |
| 2015/0363860 | A1 | 12/2015 | Lantrip et al. |
| 2016/0197769 | A1 | 7/2016 | Britt et al. |
| 2016/0197772 | A1 | 7/2016 | Britt et al. |
| 2016/0197786 | A1 | 7/2016 | Britt et al. |
| 2016/0221768 | A1 * | 8/2016 | Kadaba ................. B65G 67/04 |
| 2017/0091881 | A1 | 3/2017 | Canale et al. |
| 2017/0091882 | A1 | 3/2017 | Canale et al. |
| 2017/0359343 | A1 | 12/2017 | Sterl et al. |
| 2017/0372410 | A1 * | 12/2017 | Fruhman ............ G06Q 30/0645 |
| 2018/0211534 | A1 * | 7/2018 | de Moura ............... H04W 4/40 |
| 2018/0293619 | A1 * | 10/2018 | Asbury ............. G06Q 30/0261 |
| 2018/0356823 | A1 * | 12/2018 | Cooper ................ G08G 5/0034 |

* cited by examiner

SYSTEM FOR PROVIDING REAL-TIME ROUTING AND DATA SERVICES FOR USER EVENTS BASED ON REAL-TIME VEHICLE LOCATION

FIELD OF THE INVENTION

The present invention relates to a system for providing real-time routing and data services for user events based on real-time vehicle location. The system is typically configured for: determining a travel route to an event; causing a display of a smart device of a vehicle of a user to display the travel route; determining a parking location proximate to the event; modifying the travel route to include the parking location; identifying an item of a third party entity located proximate to the event; placing an order for the item in response to determining that a trigger event has occurred; causing a display of the user's mobile device to display information about the order once the vehicle has arrived at the parking location and the user is no longer collocated with the vehicle; determining that the mobile device of the user is collocated with a remote device of the third party entity; and transferring resources from the user to the third party entity to complete the order.

BACKGROUND

Manual interactions between users and third parties that traditionally involve manual or face-to-face conveyance of data and information are inefficient, slow, and often insecure thereby reducing productivity and security associated with all parties involved. As such, there exists a need for a system to improve the efficiency, speed, and data security of performing interactions.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In one aspect, the present invention embraces a system for providing real-time routing and data services for user events based on real-time vehicle location, and an associated method and computer program product. The system typically includes one or more computer processors, a memory, and a network communication device. The system also typically includes a software module stored in the memory and executable by the processor. In one embodiment, the software module is configured to perform the steps of identifying an event of a user; identifying a location of the event; determining a location of a mobile device of the user; determining a location of a vehicle of the user; determining that the mobile device and vehicle of the user are collocated; in response to determining that the mobile device and vehicle of the user are collocated, determining that the user has initiated travel to the event via the vehicle; determining a travel route to the event; in response to determining that the user has initiated travel to the event via the vehicle, transmitting a command to a smart device of the vehicle, the command being configured to cause a display of the smart device to display the travel route; determining a parking location proximate to the location of the event; modifying the travel route to include the parking location; in response to modifying the travel route, transmitting a second command to the smart device of the vehicle, the second command being configured to cause the display of the smart device to display the modified travel route; identifying one or more items of a third party entity located proximate to the location of the event; determining that a trigger event has occurred; in response to determining that the trigger event has occurred, placing an order for the one or more items; determining that (i) the vehicle has arrived at the parking location and (ii) the user is no longer collocated with the vehicle; in response to determining that (i) the vehicle has arrived at the parking location and (ii) the user is no longer collocated with the vehicle, transmitting a third command to the mobile device of the user, the third command being configured to cause a display of the mobile device to display information about the order; determining that the mobile device of the user is collocated with a remote device of the third party entity; and in response to determining that the mobile device of the user is collocated with the remote device of the third party entity, transferring resources from the user to the third party entity to complete the order.

In a particular embodiment, identifying the event of the user comprises: monitoring an electronic account of a user, wherein the electronic account is an email account or an electronic calendar account; identifying one or more electronic messages and/or calendar entries of the electronic account; and parsing the one or more electronic messages and/or calendar entries of the electronic account to identify the event. Identifying the location of the event may comprise extracting the location of the event from the one or more electronic messages and/or calendar entries of the electronic account.

In another particular embodiment, determining that the mobile device and vehicle of the user are collocated comprising determining that the mobile device and the smart device of the vehicle have established a communication connection. Determining the user is no longer collocated with the vehicle may comprise determining that the communication connection has been terminated.

In another particular embodiment, the software module is configured to perform the step of causing the display of the smart device to display an event reminder based on the location of the vehicle, a current time, and a start time of the event.

In another particular embodiment, the software module is configured to perform the step of causing the display of the smart device to display the information about the order information once the order has been placed and while the vehicle is traveling to the parking location.

In another particular embodiment, determining that the trigger event has occurred comprises determining that the vehicle is within a predefined distance of the parking location of the event.

In another particular embodiment, wherein determining that the trigger event has occurred comprises determining that a remaining travel time to the parking location is below a predefined threshold.

In another particular embodiment, determining that the mobile device of the user is collocated with the remote device of the third party entity comprises determining that the mobile device and the remote device have established a communication connection.

In another particular embodiment, the event is an entertainment event.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
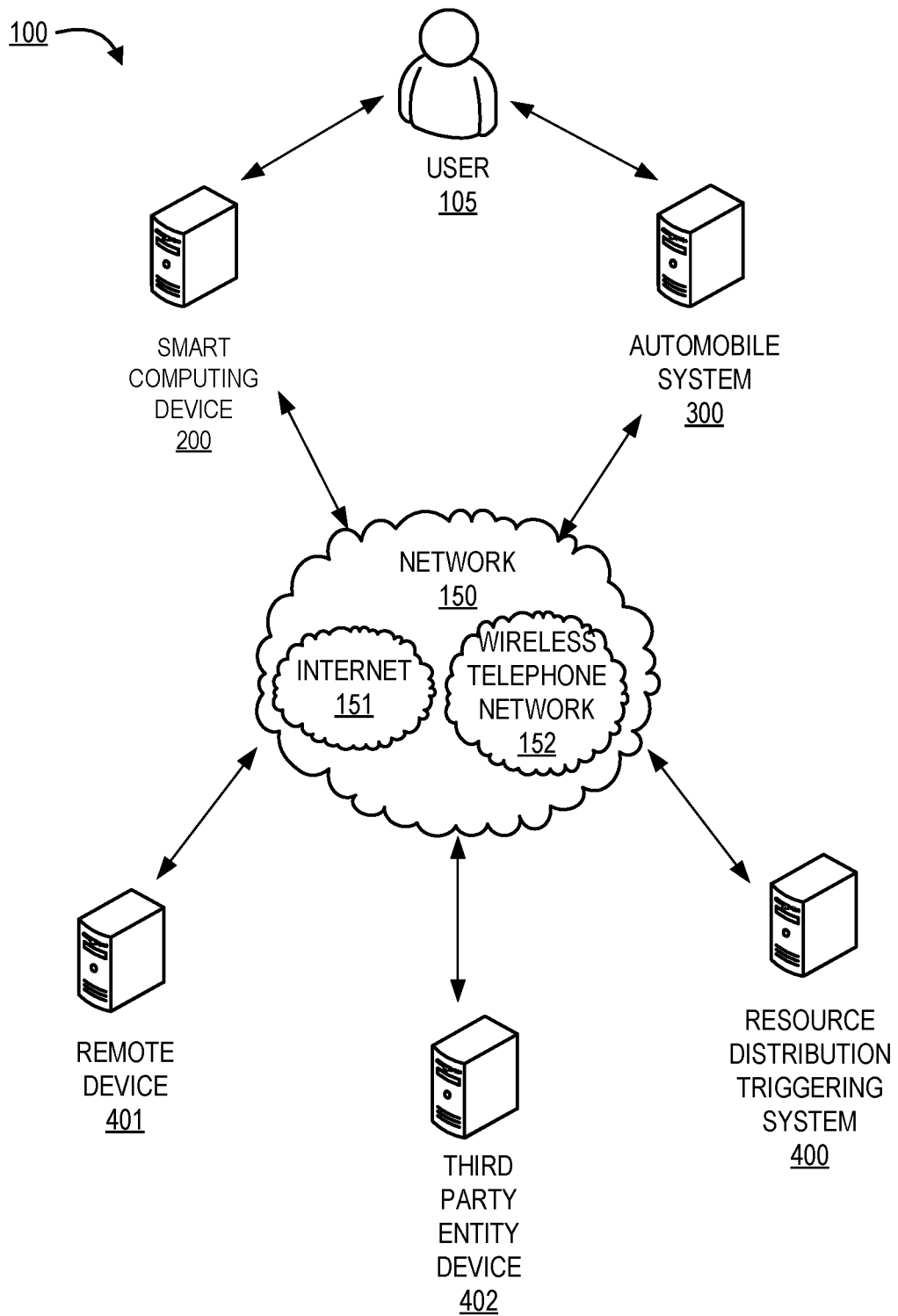
Figure 2:
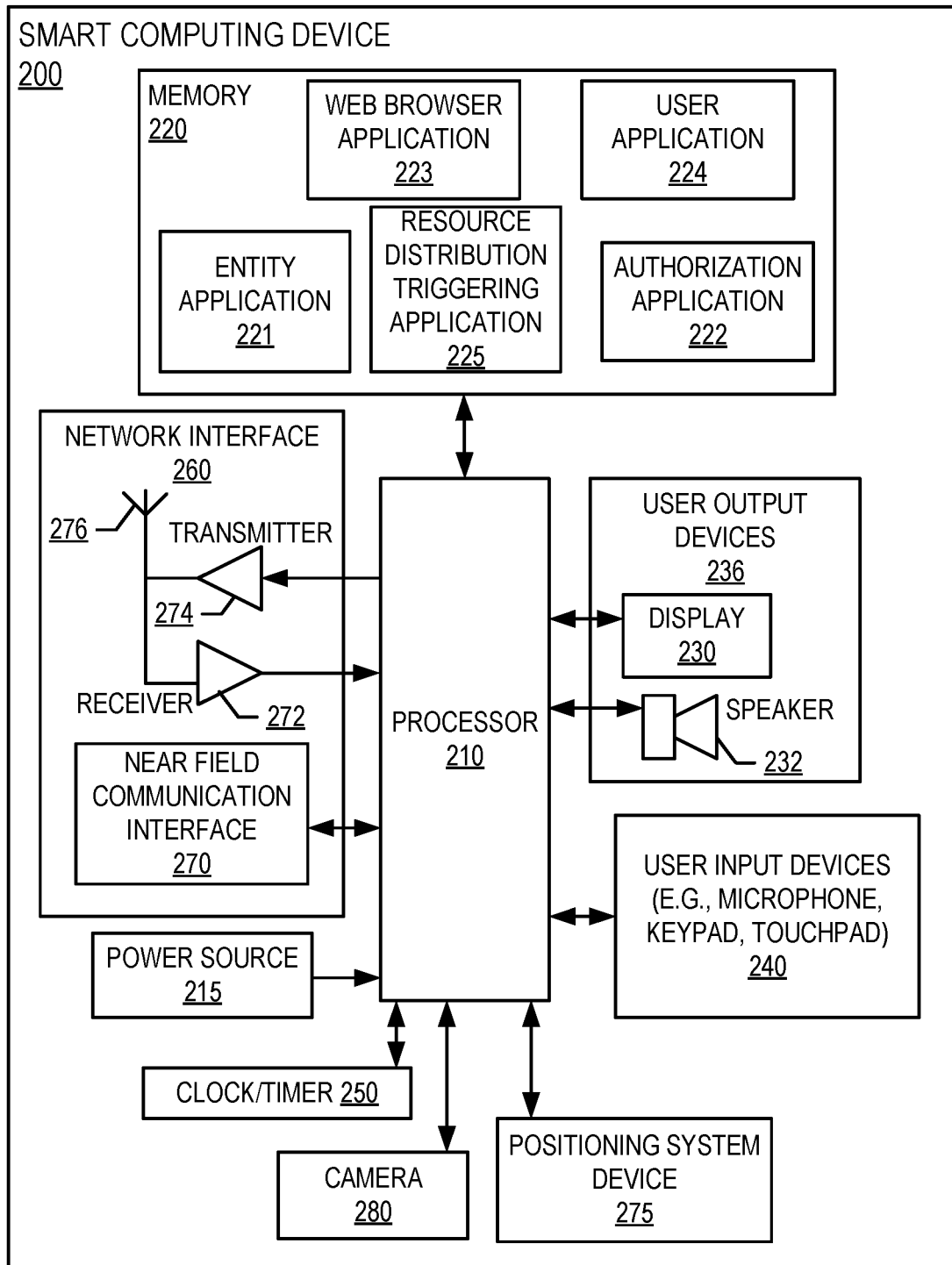
Figure 3:
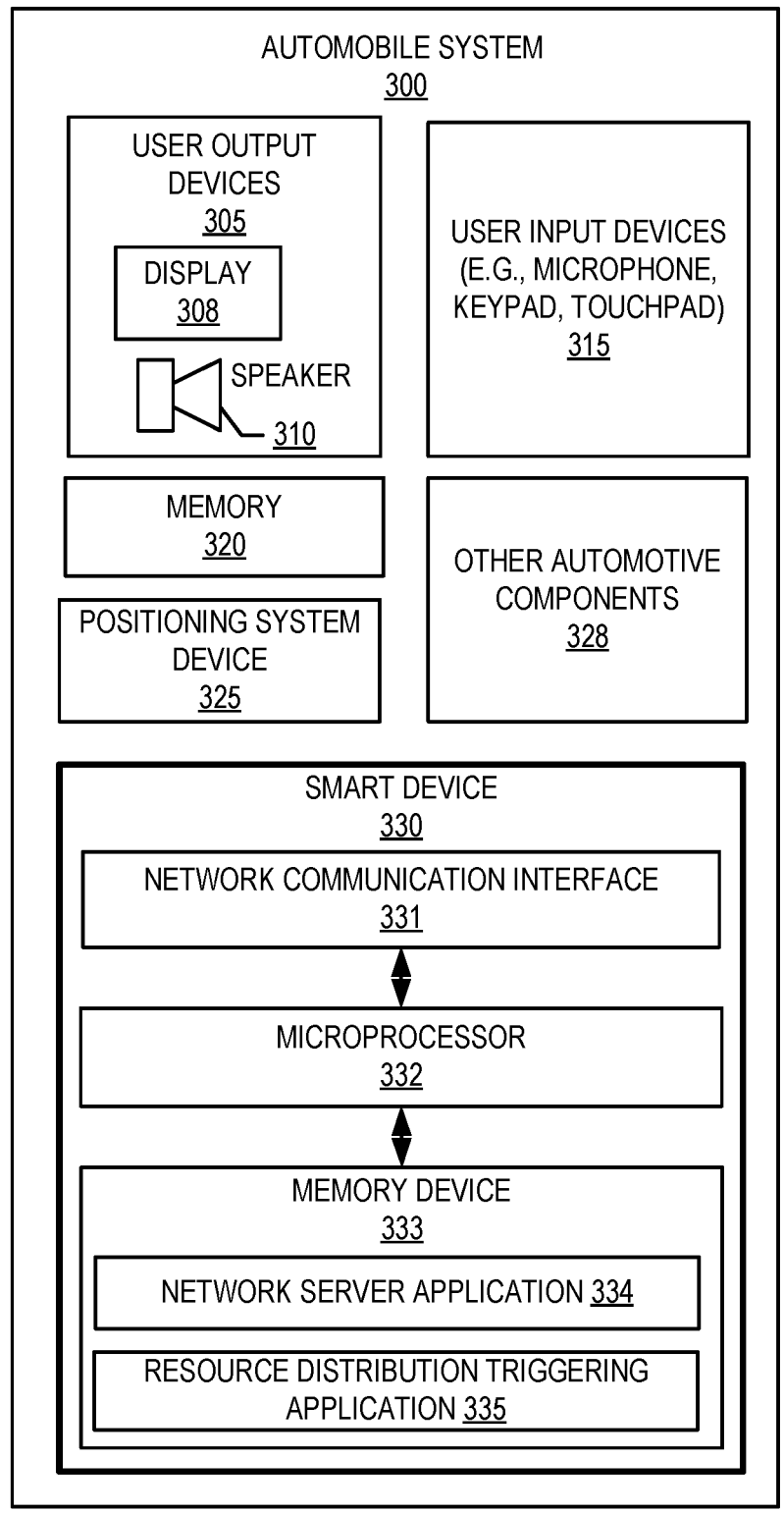
Figure 4:
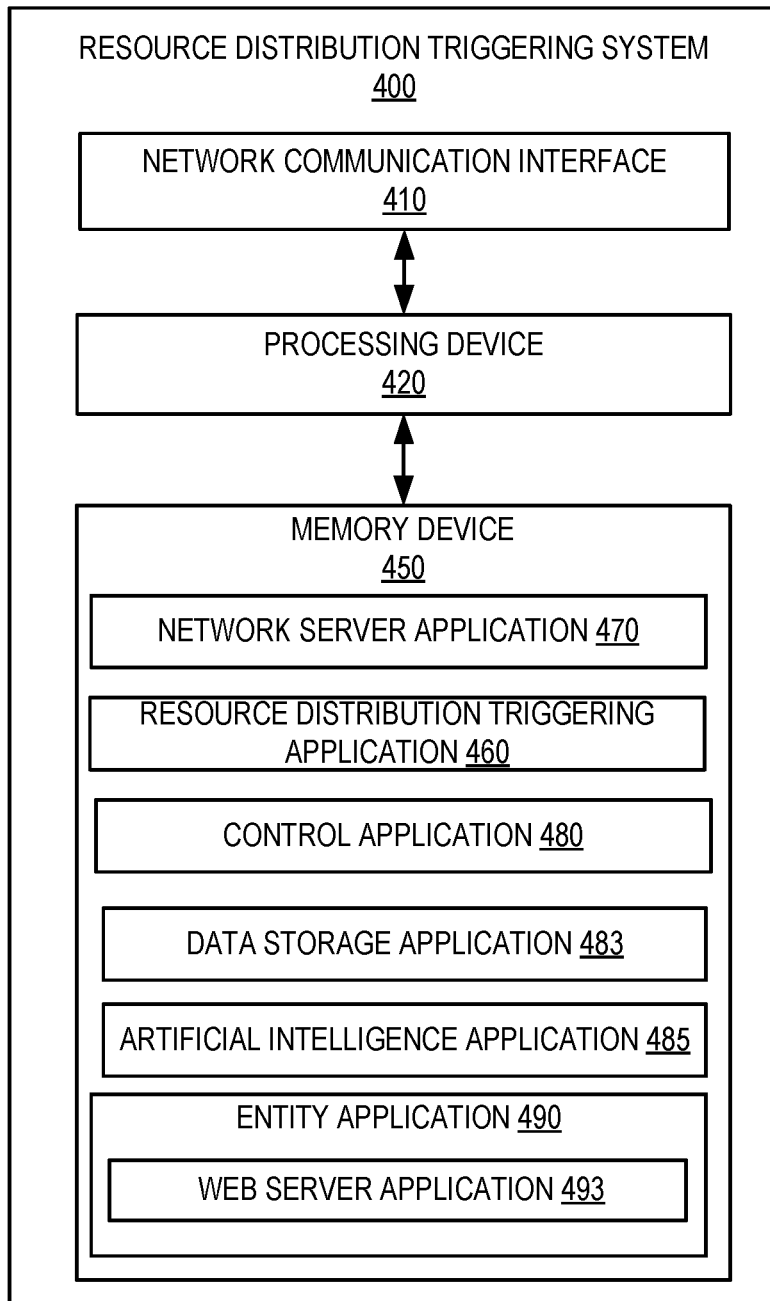
Figure 5:
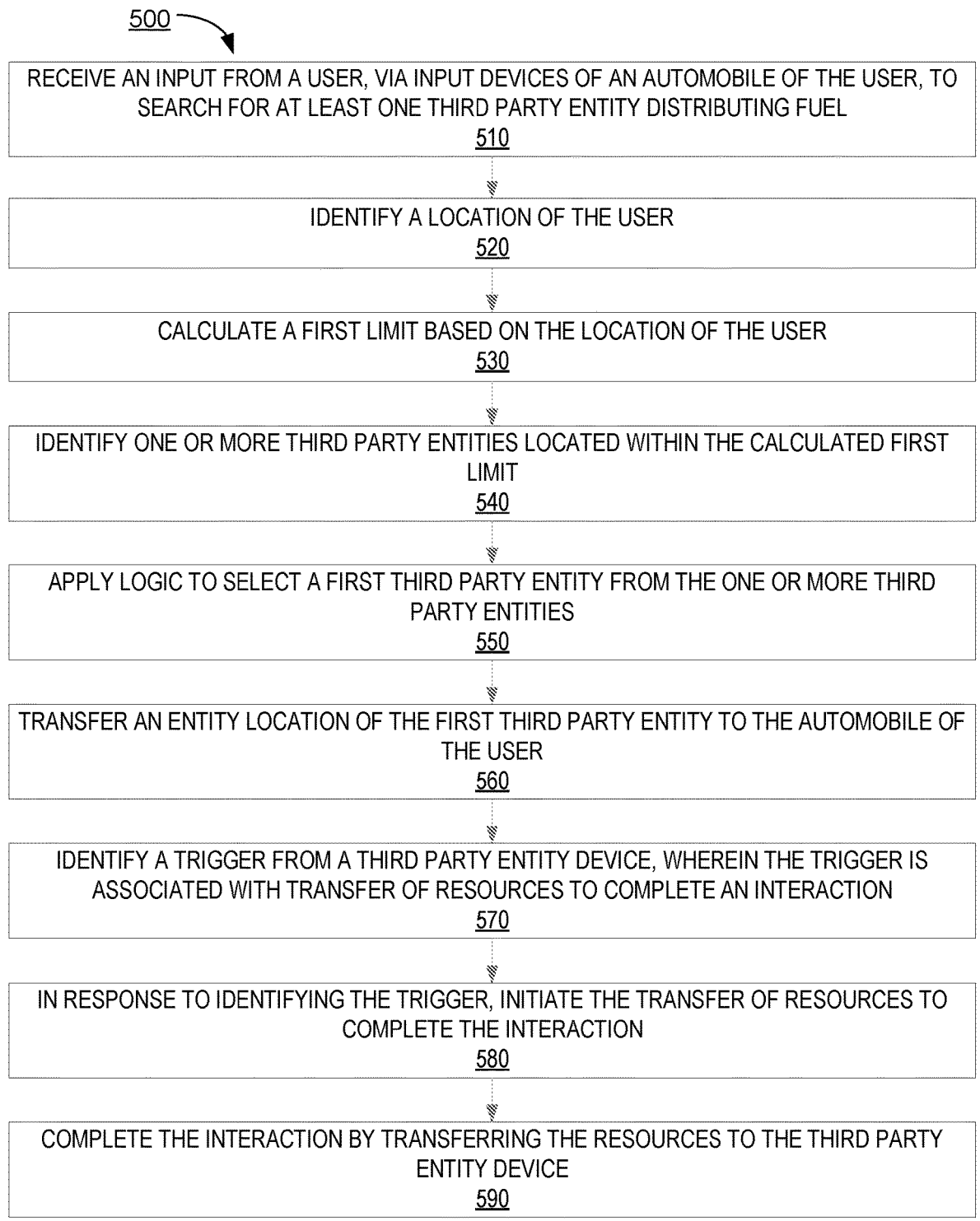
Figure 6:
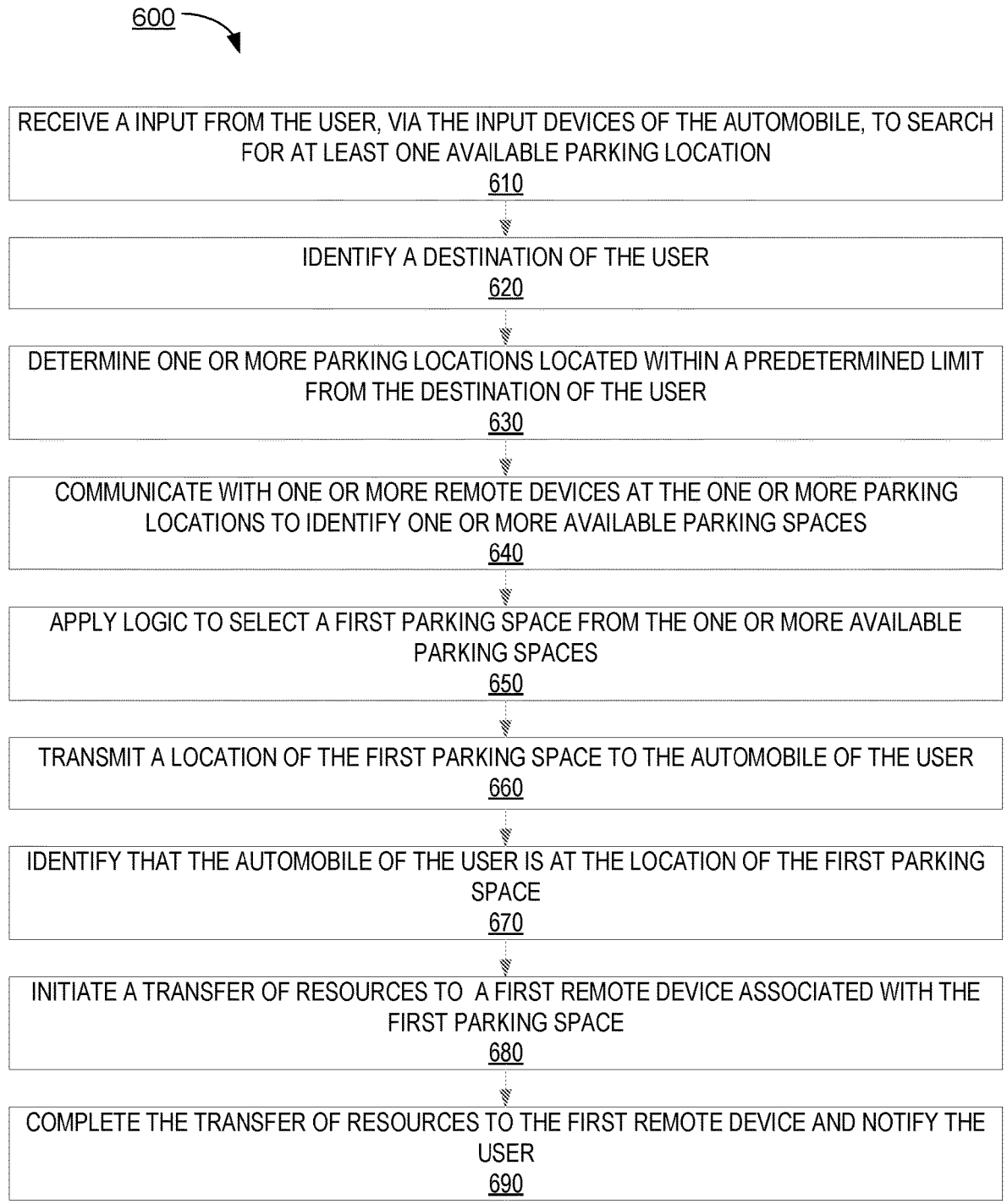
Figure 7:
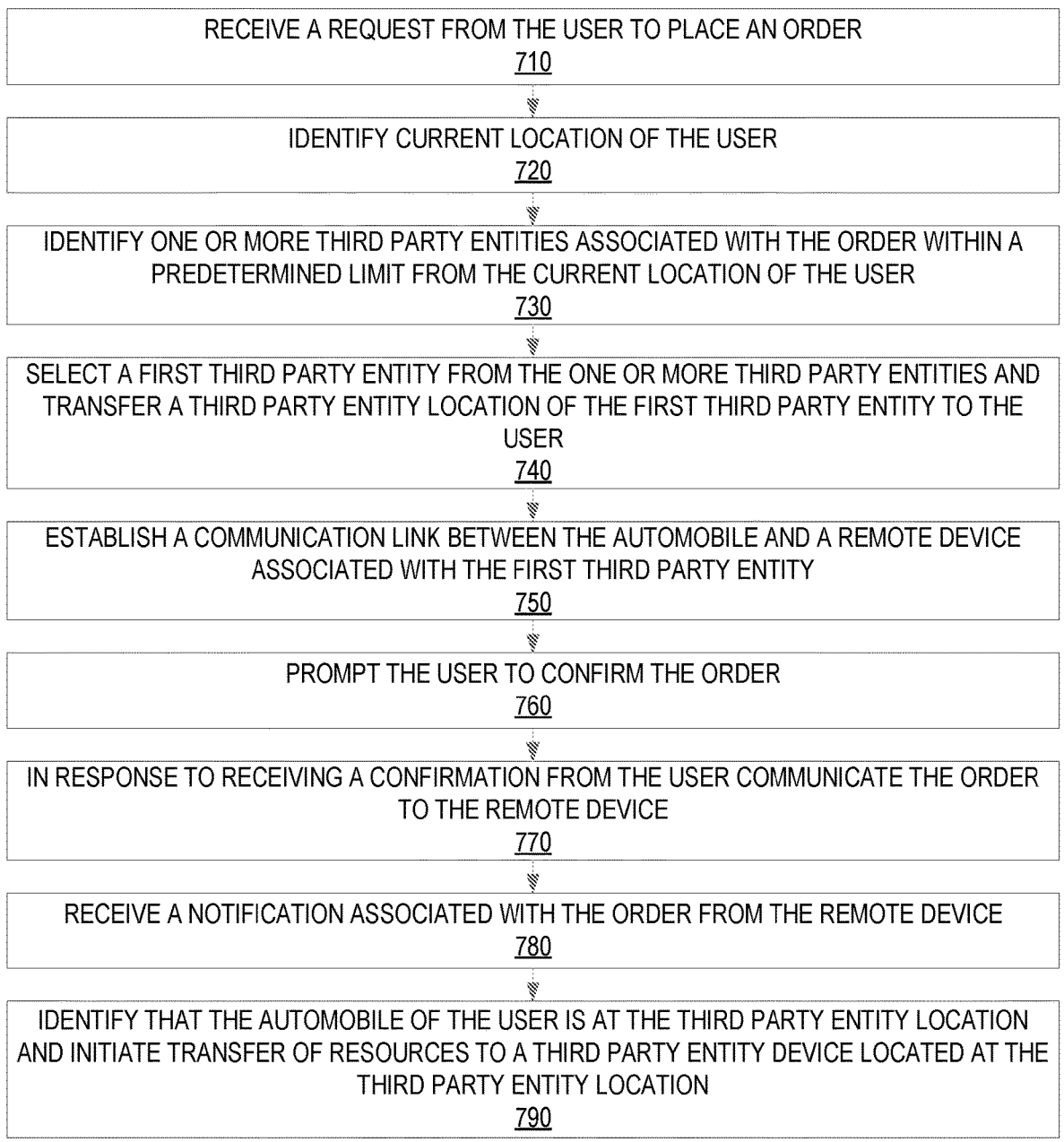
Figure 8:
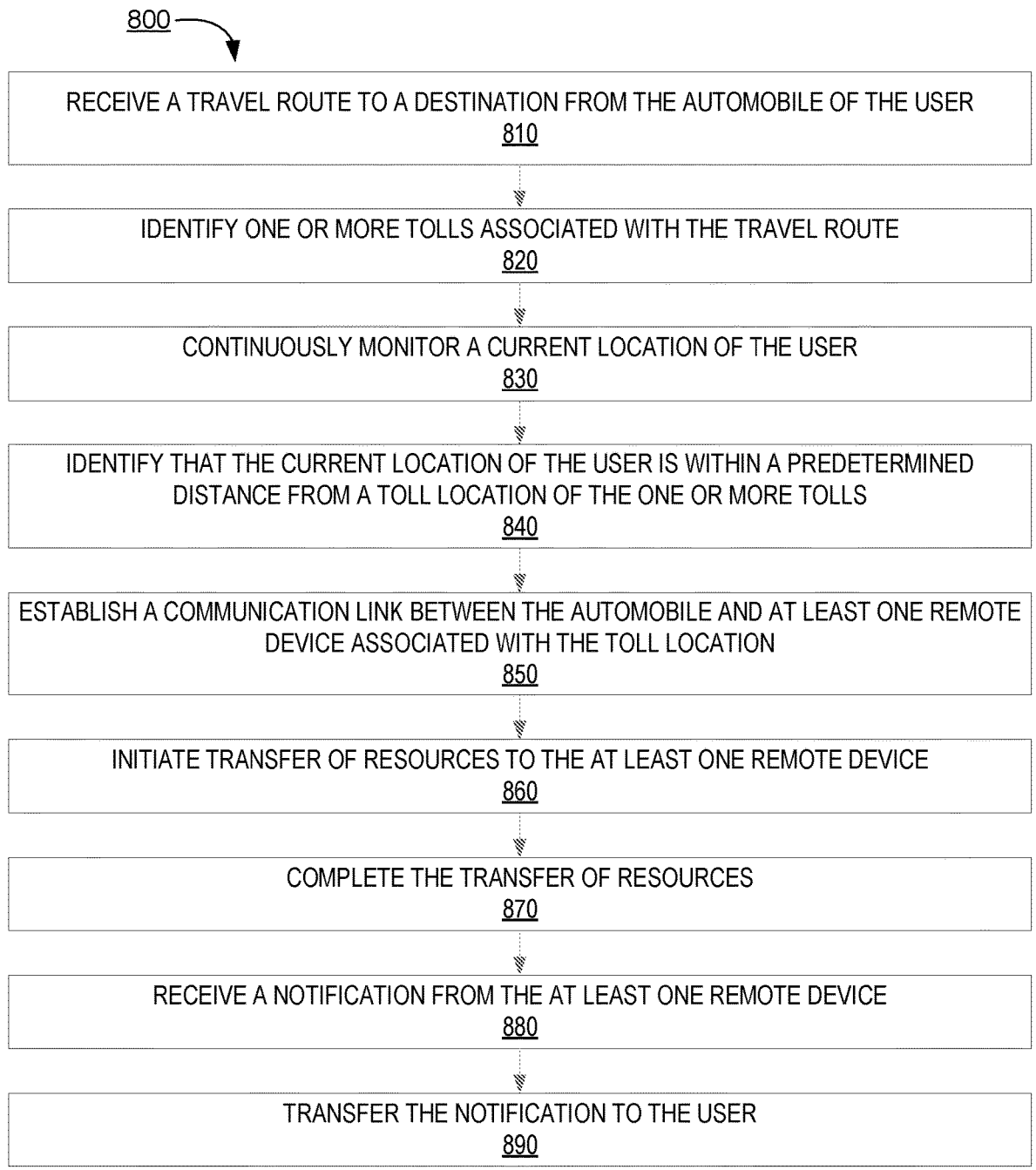
Figure 9:
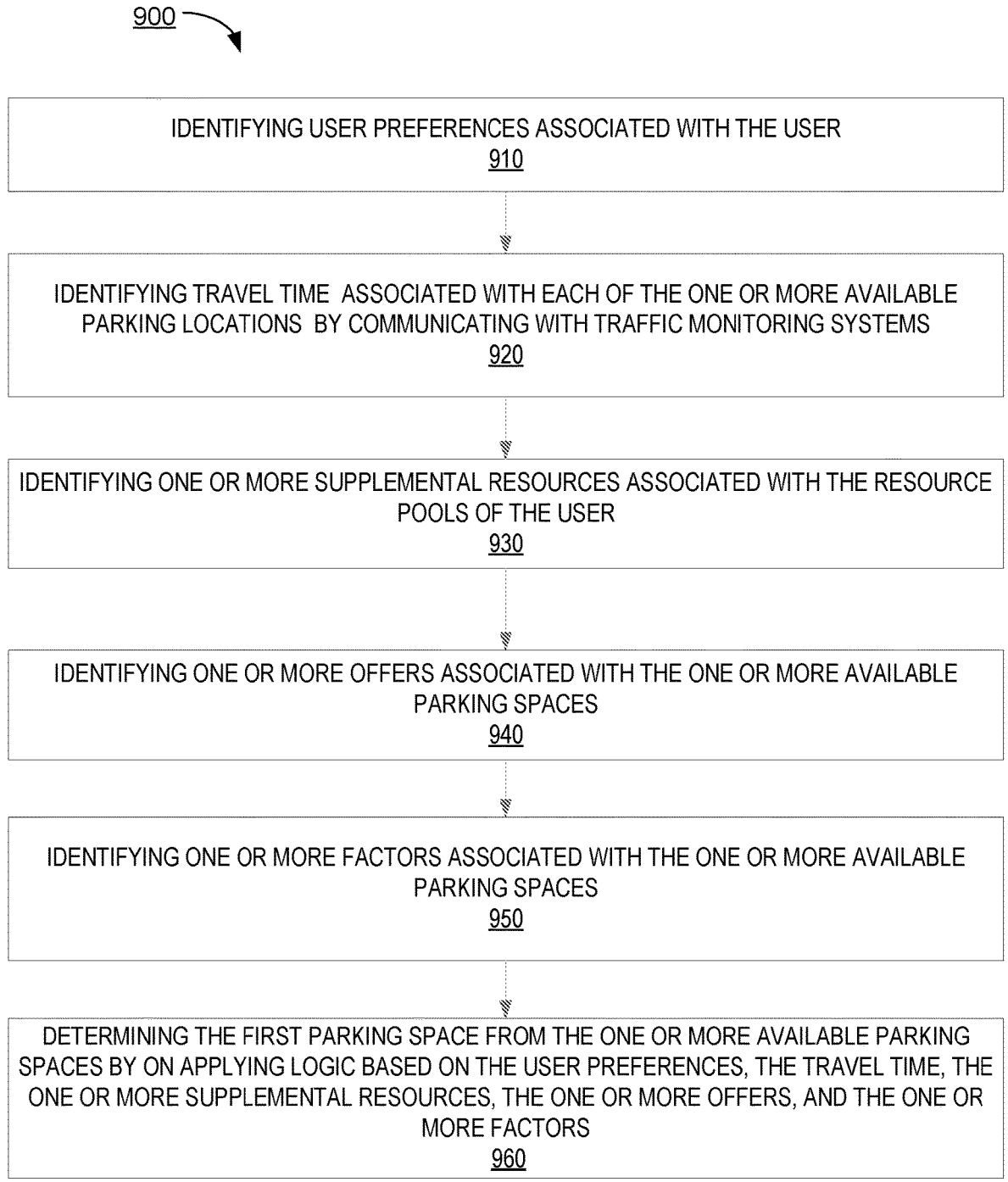
Figure 10A:
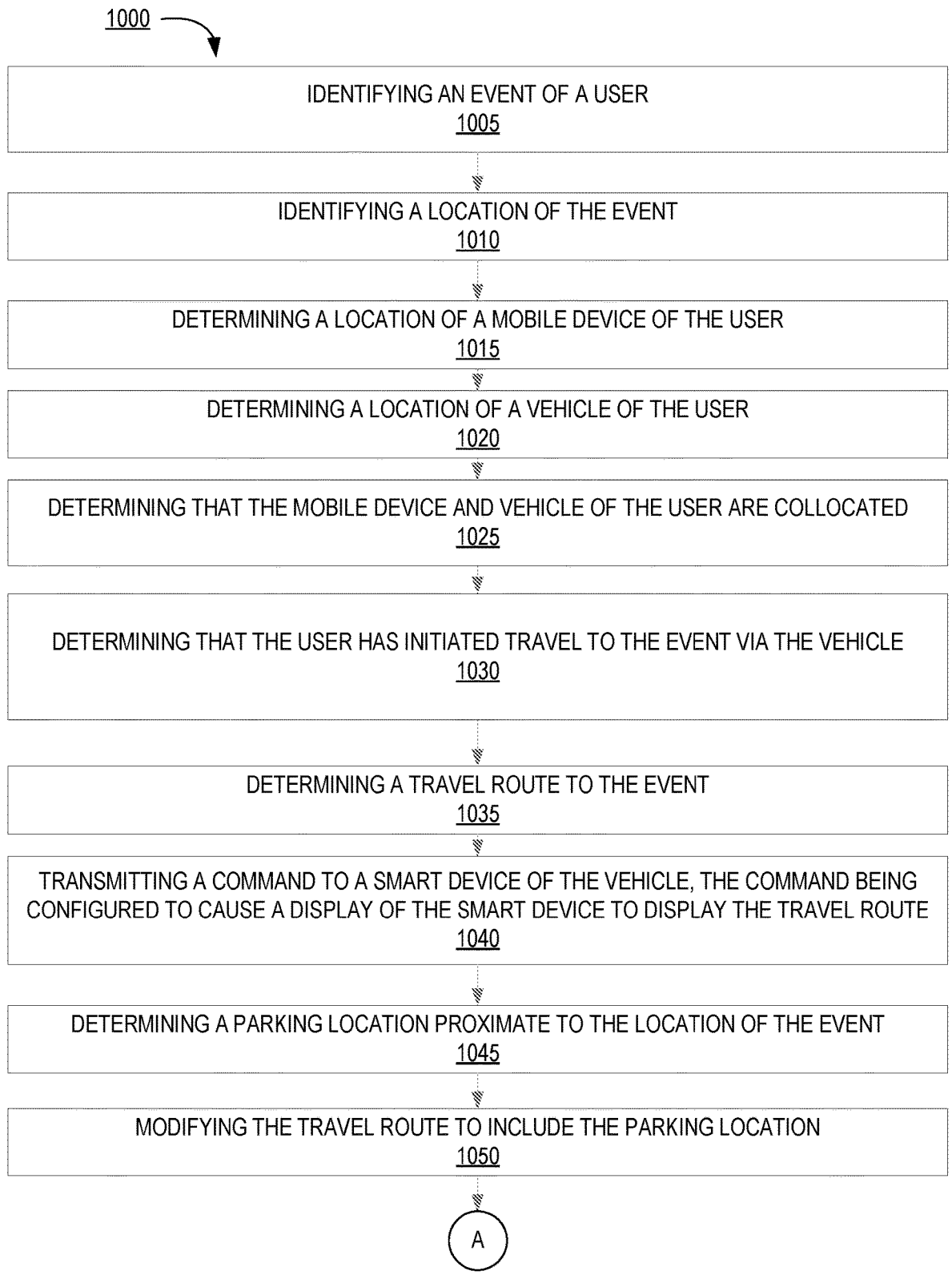
Figure 10B:
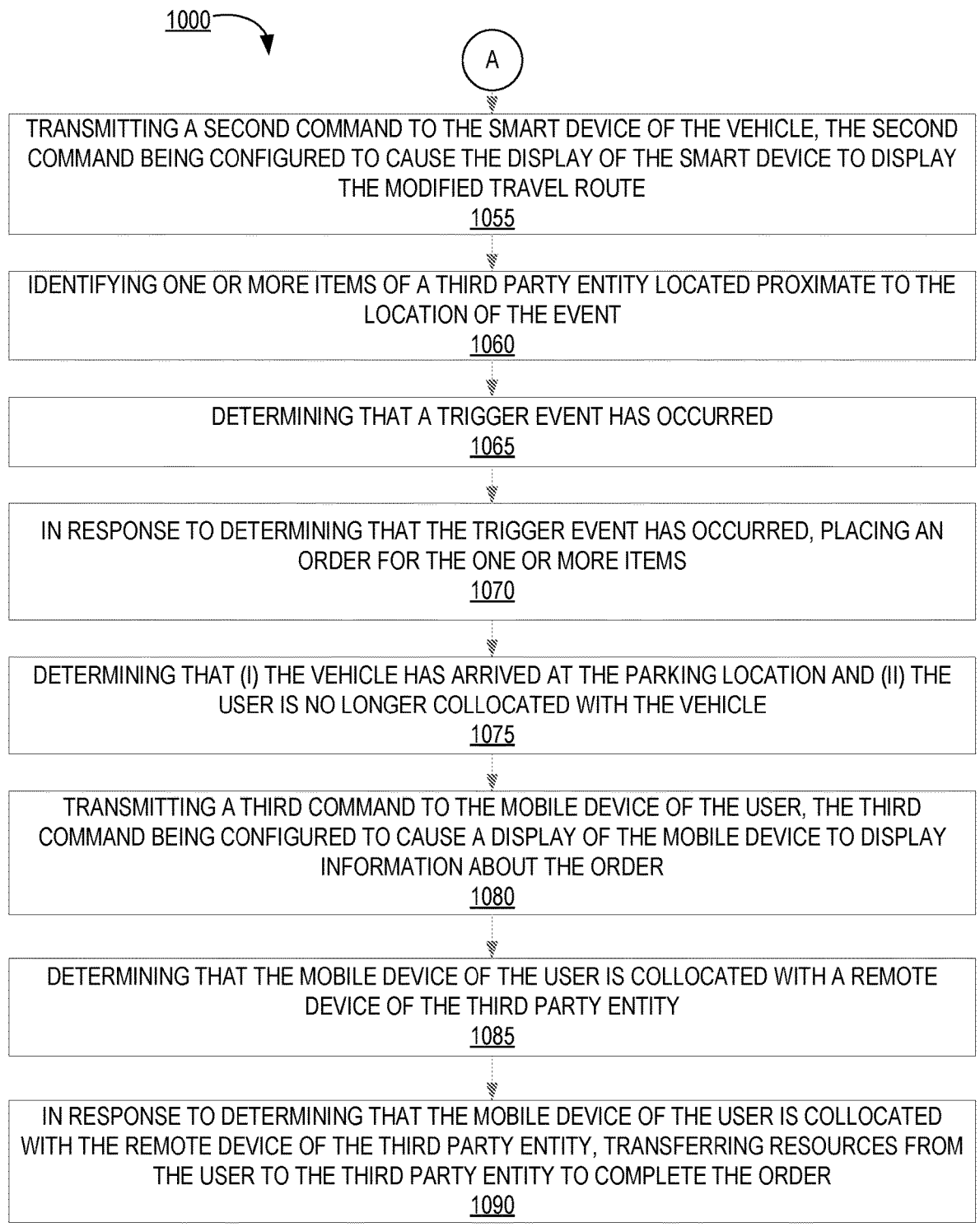

Having thus described embodiments of the invention in general terms, reference will be made to the accompanying drawings, where:

FIG. 1 presents an automobile resource distribution triggering system environment, in accordance with an embodiment of the present invention;

FIG. 2 presents a block diagram illustrating a smart computing device, in accordance with an embodiment of the present invention;

FIG. 3 presents a block diagram illustrating an automobile, in accordance with an embodiment of the present invention;

FIG. 4 presents a block diagram illustrating a resource distribution triggering system, in accordance with an embodiment of the present invention;

FIG. 5 presents a process flow for completing an interaction associated with fuel purchase via the automobile at a third party entity location, in accordance with an embodiment of the present invention;

FIG. 6 presents a process flow for completing an interaction associated with a parking location via the automobile, in accordance with an embodiment of the present invention;

FIG. 7 presents a process flow for communicating an order to a remote device of a third party entity via the automobile, in accordance with an embodiment of the present invention;

FIG. 8 presents a process flow for completing an interaction associated with one or more tolls by communicating with remote devices at toll booths via the automobile, in accordance with an embodiment of the present invention;

FIG. 9 presents a process flow for selecting a first third party entity from one or more third party entities associated with a parking location by applying logic via an artificial intelligence engine, in accordance with an embodiments of the present invention; and FIGS. 10A-B present a process flow for providing real-time routing and data services for user events based on real-time vehicle location, in accordance with an embodiments of the present invention.

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, a "financial institution" as used herein may include commercial banks, thrifts, federal and state savings banks, savings and loan associations, credit unions, investment companies, insurance companies and the like. In some embodiments, the financial institution may allow a customer to establish an account with the financial institution. An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer summary that includes only personal information associated with the customer, or the like. An account may be associated with and/or maintained by a financial institution.

An entity may be any person or organization. In some embodiments, the term "entity" or "third party entity" as used herein may be any merchant offering products or services to one or more users. This may include Quick Service Restaurants (QSR), gas stations, merchants providing parking spaces, toll booths, convenience stores, pharmacy, wholesale merchants, event providers, operators of entertainment venues, and/or the like. The term "remote device" as used herein may be any computing device utilized by third party entities. The term "third party entity device" may be any computing device provided by third party entities at third party entity locations. This may include point of sale (POS) device provided by third party entities at any of the third party locations.

In some embodiments, a "user" may be a financial institution customer (e.g., an account holder or a person who have an account (e.g., banking account, credit account, or the like)). In some embodiments, a "user" may be a customer of a third party entity.

In accordance with embodiments of the invention, an "interaction" may be a transaction, transfer of funds, transfer of resources, and may refer to any activities or communication between a user and a financial institution, between a financial institution and a third party system, activities or communication between multiple financial institutions, communication between technology application and the like. Transfer of resources may refer to a payment, processing of funds, international transfer of funds, purchase of goods or services, a return of goods or services, a payment transaction, a credit transaction, or other interactions involving user's resource or account. Unless specifically limited by the context, a "transaction", a "transfer of funds", a "record" may refer to any activity initiated between a user and a financial institution or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points etc. When discussing the resource transfers or transactions are evaluated it could mean that the transactions have already occurred, are in the process of occurring or being processed, or they have yet to be processed/posted by one or more financial institutions.

An "event" typically refers to an event that a user is attending. An event may be an entertainment event, such as a sporting event, concert, play, ballet, musical, movie screening, or the like. An "event venue" typically refers to a location where an event takes place, such as a stadium, area, theater, movie theater, concert hall, or the like.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 provides a block diagram illustrating an environment 100 an automobile resource distribution triggering system. As depicted in FIG. 1, the operating environment 100 may include a resource distribution triggering system 400 interacting with a smart computing device 200 and automobile system 300 of a user 105, one or more remote devices 401, one or more third party entity devices 402, using a network 150 that includes an internet 151 and wireless telephone network 152. In some embodiments, the resource distribution triggering system 400 may be maintained by a financial institution. In some embodiments, the resource distribution triggering system 400 may be owned and maintained by the financial institution. In such an embodiment, the resource distribution triggering system 400 communicates with a financial institution system to complete one or more interactions. In some embodiments, the resource distribution triggering system 400 may be a part of a financial institution system (not shown) or a system operated by another entity. In alternate embodiments, the resource distribution triggering system 400 may be a part of the automobile system 300. In some embodiments, the resource distribution triggering system 400 may be part of a smart chip which is placed in the automobile system 300. In some embodiments, the resource distribution triggering system 400 may interact with smart computing devices and automobiles associated with a plurality of users (not shown) at any given instance. The user 105 and other plurality of users may be customers of the financial institution or the third party entities.

The environment 100 also may include a plurality of computing devices of the user 105. The computing devices may include any machine, apparatus, system or the like that may be connected to and communicate with other devices over a network 150. The smart computing device 200 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology.

Referring now to FIG. 2, the smart computing device 200 may be any computing device utilized by the user 105. In embodiments of the present invention, the smart computing device may be any device of the user connected to the automobile of the user via a wired (e.g., USB port) or wireless technology (e.g., Bluetooth). The smart computing device may be any wearable device, laptop, mobile device, smart phone device, PDA, tablet, or any other mobile device. In one embodiment of the invention, there may be multiple smart computing devices, wherein the multiple smart computing devices may be a mobile telephone and a smart watch. Other types of smart computing devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned. In one embodiment of the present invention, the smart computing device 200 is a mobile device.

In some embodiments, the smart computing device 200 includes a processor 210 communicably coupled to such devices as a memory 220, user output devices 236, user input devices 240, and a network interface 260. The smart computing device 200 further includes a power source 215, such as a battery, for powering various circuits and other devices that are used to operate the smart computing device 200. Embodiments of the smart computing device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the smart computing device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 223. The web browser application 223 may then allow the smart computing device 200 to transmit and receive web content, such as, for example, location-based content and/or other web page content, according to a Wireless Application Protocol (WAP), Hypertext Transfer Protocol (HTTP), and/or the like. The memory device 220 may include other applications such as financial institution application 221, a user application 224, resource distribution triggering application 225, authorization application 222, and/or the like. The user application 224 may be a digital wallet application or any application that maintains virtual cards which is provided by the financial institution system. In some embodiments, the resource distribution triggering application 225 may be a part of the financial institution application 221. In some embodiments, financial institution application 221 may be a mobile banking application. The resource distribution triggering application 225 interacts with the resource distribution triggering system 400 to perform one or more functions. In some embodiments, the authorization application 222 allows the smart computing device 200 to interact with financial institution systems and resource distribution triggering system 400. In some embodiments, the smart computing device may include a fitness tracking application, wherein the fitness tracking application comprises information associated with diet plans, calorie goals, and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the smart computing device 200 may be configured to operate with one or more air interface standards, communication protocols, modulation types, and access types. By way of illustration, the smart computing device 200 may be configured to operate in accordance with any of a number of first, second, third, and/or fourth-generation communication protocols and/or the like. For example, the smart computing device 200 may be configured to operate in accordance with second-generation (2G)

wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The smart computing device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the smart computing device 200. In some embodiments, the NFC interface 270 is not supported in and/or on the smart computing device 200, but the NFC interface 270 is otherwise operatively connected to the smart computing device 200 (e.g., where the NFC interface 270 is a peripheral device plugged into the smart computing device 200). Other apparatuses having NFC interfaces mentioned herein may be configured similarly. In some embodiments, the NFC interface 270 of the smart computing device 200 is configured to contactlessly and/or wirelessly communicate information to and/or from a corresponding NFC interface of another apparatus (e.g., a point of sale (POS) device, an automated teller machine (ATM) or another mobile or computing device). In one embodiment of the present invention, the NFC interface of the smart computing device 200 wirelessly communicates information (virtual card information such as virtual card number, CVV code, expiration date) stored in the user application 224 to perform a transaction.

As described above, the smart computing device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the smart computing device 200 to transmit data, may include any of a number of devices allowing the smart computing device 200 to transmit data, such as a keypad, keyboard, touch-screen, touchpad, microphone, mouse, joystick, other pointer device, button, soft key, and/or other input device(s). The user interface may also include a camera 280, such as a digital camera.

The smart computing device 200 may also include a positioning system device 275 that is configured to be used by a positioning system to determine a location of the smart computing device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the smart computing device 200. In other embodiments, the positioning system device 275 includes a proximity sensor or transmitter, such as an RFID tag, that can sense or be sensed by devices known to be located proximate a location to determine that the smart computing device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like. The memory 220 can store any of a number of applications which include computer-executable instructions/code executed by the processor 210 to implement the functions of the smart computing device 200 and/or one or more of the process/method steps described herein.

These applications also typically provide a graphical user interface (GUI) on the display 230 that allows the user 105 to communicate with the smart computing device 200, a financial institution system and/or other devices or systems. The memory 220 can also store any of a number of pieces of information, and data, used by the smart computing device 200 and the applications and devices that make up the smart computing device 200 or are in communication with the smart computing device 200 to implement the functions of the smart computing device 200 and/or the other systems described herein. For example, the memory 220 may include such data as user authentication information.

Referring now to FIG. 3, the automobile system 300 comprises one or more components of an automobile. The automobile may be any wheeled motor vehicle comprising user output devices 305, user input devices 315, memory 320, positioning system device 325, other automotive components, and a smart device 330. In some embodiments, the smart device 330 may be a smart chip. The smart chip may be a micro device in the automobile. In embodiments of the invention, the smart chip 330 is provided the financial institution. The smart chip 330 may be integrated into any wheeled vehicles with user input and output devices. In some embodiments, the smart chip is maintained by the financial institution. As shown in the FIG. 3, the smart chip 330 may include a network communication interface 331, microprocessor 332, and memory device 333. The microprocessor 332 is configured to use the network communication interface 331 to communicate with one or more other devices on the network 150. In this regard, the network communication interface 331 may include an antenna operatively coupled to a transmitter and a receiver (together a "transceiver"). In some embodiments, the smart chip 330 may utilize a transceiver of the automobile. The microprocessor 332 is configured to provide signals to and receive signals from the transmitter and receiver, respectively. The smart chip 330 may utilize wireless network including satellite or any other wireless network of the automobile to provide signals and receive signals. In some embodiments, the smart chip 330 may utilize a wireless network of the smart computing device 200, which may be connected to the automobile system 300, to provide signals and receive signals to perform one or more steps in the process flows described below. The smart chip 330 may be configured to raise certain triggers and alert the resource distribution triggering system upon occurrence on any of one or more conditions. For example, the smart chip may identify an input from a user via any of the user input devices and may alert the system. In one example, the smart chip may identify that the user has entered a destination location via the user input devices and alerts the system to trigger processes.

The network communication interface 331 may also include a near field communication (NFC) interface. The NFC interface may include a smart card, key card, proximity card, Bluetooth® device, radio frequency identification (RFID) tag and/or reader, transmitter, receiver, and/or the like. In some embodiments, the NFC interface communicates information via radio, infrared (IR), and/or optical transmissions. In some embodiments, the NFC interface is configured to operate as an NFC transmitter and/or as an NFC receiver (e.g., an NFC reader). Also, it will be understood that the NFC interface may be embedded, built, carried, and/or otherwise supported in and/or on the smart device 330. In some embodiments, the NFC interface is not supported in and/or on the smart device 330, but the NFC interface is otherwise operatively connected to the smart device 330. For example, the smart computing device 200 may be connected to the network communication interface 331 of the automobile system 300 and may function as the NFC interface of the automobile system 300. In some embodiments, the NFC interface of the smart device 330 is configured to contactlessly and/or wirelessly communicate information to and/or from a corresponding NFC interface of another apparatus (e.g., a point of sale (POS) device, an automated teller machine (ATM) or another mobile, remote device, third party entity devices, or computing device). In one embodiment of the present invention, the NFC interface of the smart device 330 wirelessly communicates information (virtual card information such as virtual card number, CVV code, expiration date) stored in the memory 320 of the automobile or user application 224 of the smart computing device 200 to and/or from a corresponding NFC interface of a POS device to perform an interaction.

The memory device 333 may include one or more applications or information accessed or received by the smart chip 330. The memory device, as shown, comprises one or more applications including a network server application 334, resource distribution triggering application 335, and/or the like. The network server application 334 may be configured to cause the microprocessor to interact with other components of the automobile, smart computing device 200, resource distribution triggering system 400, remote device 401, third party entity device 402, and/or other device associated with the network 150. The resource distribution triggering application may be utilized to receive and communicate information to the resource distribution triggering system 400 to perform one or more steps in the process flow described herein. The smart chip 330 may receive instructions from the resource distribution triggering system to perform one or more steps described herein. In some embodiments, the smart chip 330 may receive information from the resource distribution triggering system 400, the third party entity device 402, or the remote device 401 and communicate the information to the user 105 utilizing the user output devices 305 including, but not limited to, display 308 and speaker 310 of the automobile 300. In some embodiments, the smart chip 330 may receive information from the user 105 via the user input devices including, but not limited to, microphone, keypad, touchpad, and/or the like of the automobile and communicate the information received form the user to the resource distribution triggering system 400, the third party entity device 402, or the remote device 401 to perform one or more steps in the process flows described herein. In some embodiments of the present invention, the smart chip 330 may identify current location of the automobile utilizing the positioning system device 325 of the automobile. In some other embodiments, the smart chip 330 may utilize other automotive components 328 or information available in the other automotive components 328 of the automobile. The automotive components, may include any body and main parts, electrical and electronics (including navigation system, gauges and meters, sensors, electrical switches, cameras, audio/video devices, and/or the like), interior components (car seats, floor components, and/or the like), power train and chassis, and/or the like. In some embodiments, the automobile further comprises a chip reader to facilitate completion of one or more interactions. In some embodiments, the system comprises any other built in mechanism to facilitate completion of one or more interactions. In some embodiments, the built in mechanism and the chip reader may be provided by a financial institution. All or some components of the automobile described above may be considered as an automobile system.

FIG. 4 provides a block diagram illustrating the resource distribution triggering system 400, in greater detail, in accordance with embodiments of the invention. As illustrated in FIG. 4, in one embodiment of the invention, the resource distribution triggering system 400 includes one or more processing devices 420 operatively coupled to a network communication interface 410 and a memory device 450. In certain embodiments, the resource distribution triggering system 400 is operated by a financial institution, although the resource distribution triggering system 400 may be operated by another entity. In some embodiments, the resource distribution triggering system 400 is part of a system of the automobile system 300, wherein the resource distribution triggering system 400 may be embedded within any component of the automobile. In some embodiments of the invention, the resource distribution triggering system 400 is part of the smart chip 330, wherein the smart chip 330 is placed in the automobile and is a part of the automobile. In such an embodiment, the system establishes a direct communication link with the automobile system. In some embodiments, the resource distribution triggering system 400 may be an independent system, wherein the resource distribution triggering system 400 communicates with the automobile to performs one or more actions described in the process flows below via the smart chip 330 of the automobile. In such an embodiment, the system 400 establishes a communication link with the automobile system via the smart chip. For example, the system 400 may communicate with user input devices 315, positioning device 325, other automotive components 328, and user output devices 305 via the smart chip 330. In such embodiments, the system 400 may connect with the smart computing device 200 of the user via the smart chip 330, wherein the smart computing device 200 is present with the user and wherein the smart computing device 200 may be connected with the automobile system 300. In some embodiments, the smart computing device 200 may not be connected with the automobile system 300 via wired or wireless technology.

In one embodiment, the resource distribution triggering system 400 is part of a financial institution system. In such an embodiment, a resource distribution application performing the operations of the resource distribution triggering system 400 is stored in the entity system. In such embodiments, the smart chip may be configured to perform one or more steps of the process flows described herein and the resource distribution triggering system monitors and controls the smart chip and provides any additional information required to perform the one or more steps. In some embodiments, the resource distribution triggering system 400 may be a part of the smart chip 330 in the automobile.

It should be understood that the memory device 450 may include one or more applications and one or more databases or other data structures/repositories. The memory device 450 also includes computer-executable program code that instructs the processing device 420 to operate the network communication interface 410 to perform certain communication functions of the resource distribution triggering system 400 described herein. For example, in one embodiment of the resource distribution triggering system 400, the memory device 450 includes, but is not limited to, a network server application 470, a resource distribution triggering application 470, control application 480, a data storage application 483, artificial intelligence engine application 485 and other computer-executable instructions or other data. The computer-executable program code of the network server application 470, the resource distribution triggering application 470, the control application 480, and the data storage application 483, artificial intelligence engine application 485 may instruct the processing device 420 to perform certain logic, data-processing, and data-storing functions of the resource distribution triggering system 400 described herein, as well as communication functions of the resource distribution triggering system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as computing device 200. The processing device 420 is configured to use the network communication interface 410 to transmit and/or receive data and/or commands to and/or from the other devices connected to the network 150. The resource distribution triggering system 400, communicates with the smart chip 330 of the automobile to perform various steps described herein. The resource distribution triggering system 400, communicates with remote devices 401 and third party entity devices 402 to perform various steps described herein. In some embodiments, the resource distribution triggering system 400, communicates with other systems such as traffic monitoring system, entity system, authorization systems, and/or the like. The resource distribution triggering system 400 also comprises an artificial intelligence engine.

FIG. 5 presents a process flow 500 for completing an interaction associated with fuel purchase via the automobile at a third party entity location. As shown in block 510, the resource distribution triggering system 400 receives an input from the user 105 to search for at least one third party entity selling fuel. Fuel may be any of the available forms of fuel including, but not limited to, diesel, gas, electric, or the like. The input may be a voice command, a text command, and/or the like received from the user via the user input devices 315 of the automobile. The system instantly recognizes the input received from the user via the user input devices. In some embodiments, the system may identify that fuel in the automobile has dropped below a predetermined limit and automatically communicates a low fuel input to the system.

In some embodiments, the system may communicate with other automobile components such as gauges or meters to identify that fuel in the automobile has dropped below a predetermined limit. For example, the predetermined limit may be 1 gallon in non-electric automobiles or 10 percent in electric automobiles. In some embodiments, the system may identify that the user is travelling to a destination and determine that refueling is required to reach the destination. The system then prompts the user, via the user output devices 305, to determine if the user would like to refuel. Upon receiving an input from the user, the system continues the process and proceeds to block 520.

As shown in block 520, the system then identifies, a current location of the user. The system communicates with the positioning system device 325 to identify the current location of the user and transfer it back to the system. In some embodiments, the system may connect with the smart computing device 200 such as mobile device and may utilize the positioning system device 275 to determine the current location of the user. In such embodiments, the smart computing device 200 may be connected with the automobile 300 via wired or wireless technology associated with the smart computing device 200. In some embodiments, the system may connect with the smart computing device 200 via the smart chip 330 in the automobile 300. In some embodiments, the system may use satellite data to determine the location of the user. The system along with identifying the current location of the user, determines the level of fuel in a gas tank of the automobile 300 by communicating with other automobile components 328 of the automobile 300. For example, the system may communicate with a system/component of the automobile 300 to retrieve fuel gauge data.

As shown in block 530, the system calculates a first limit based on the location of the user. The first limit is the maximum distance that the user can travel before running out of fuel based on the current location of the user and the level of fuel in the gas tank previously identified by the system. In other words, the maximum distance is based on the fuel consumption of the automobile. In some embodiments, the system may also identify the travel route and the destination of the user and communicate with traffic monitoring systems (not shown) to determine traffic in the travel route of the user. The system uses the current traffic information to calculate the first limit.

As shown in block 540, the system identifies the one or more third party entities located within the calculated first limit. The one or more third parties may be any merchants (e.g., gas stations) selling fuel located within the first limit from the current location of the user. The system identifies the one or more third parties along the travel route of the user.

As shown in block 550, the system applies logic to select a first third party entity from the one or more third party entities. For example, the system may identify that a merchant 'A' located at distance 'A' is selling fuel at a lower price than a merchant 'B' located at distance 'B' which is lower than distance 'A' at a price higher than the price offered by Merchant 'A.' In such an exemplary embodiment, the system considers the current traffic, user preferences (such as a particular gas station or a type of fuel available at the gas stations, and/or the like), and supplemental resources (rewards or cashback, membership perks, or the like) associated with the resource pool (credit account, debit account, or the like) of the user to select a merchant from the one or more merchants initially identified by the system. In some embodiments, the automobile 300 may be utilized by the one or more users. The system applies logic based on the user driving the car. The system identifies the user driving the car by communicating with the other automotive components of the automobile to identify driving patterns, weight of the user in the driver seat, driver seat preferences, or the like.

As shown in block 560, the system transfers an entity location of the first third party entity to the automobile. The system may automatically add the entity location to the selected travel route of the user via the navigation system of the automobile 300. In some embodiments, the system may add the entity location to the selected travel route of the user after receiving an approval from the user. In some embodiments, the system may identify a second third party entity from the one or more third party entities by applying logic based on receiving disapproval from the user and the system may add user's disapproval to the user preferences. In some embodiments, the system may store preferences associated with the user's disapproval in the memory of the automobile 300. In some embodiments, the system may store preferences associated with the user's disapproval in the memory of the smart chip 330. In some embodiments, the system upon adding the entity location to the selected travel route of the user, communicates with remote devices (e.g., fuel dispenser monitoring device) associated with the first third party entity to identify an empty refueling station and block the empty refueling station for the user. The system may receive a confirmation from the remote device about reserving the refueling station and may communicate the confirmation to the user via the user output devices of the automobile.

In some embodiments, the system may access one or more to-do lists of the user stored in the smart computing device of the user, and may identify that one or more products in the to-do list (e.g., grocery list) are available at the first third party entity location. The system may then communicate, after receiving an approval from the user, an order comprising one or more products in the to-do list to the third party devices (online ordering platform) associated with the first third party entity, wherein an employee of the first third party entity after receiving the order may fulfill the order before the user reaches the third party entity location. In some embodiments, the system may identify that the user purchased a set of products after refueling during the last visit and may prompt the user to identify if he/she would like to order same products before reaching the third party entity location.

The system after transferring the location of the first third party entity, continuously monitors a current location of the user, via the one or more components of the automobile and identifies that the current location of the user matches the location of the first third party entity. The system may then establish a communication link between the automobile system and a third party entity device (e.g., fuel dispenser or point of sale), at the location of the first third party entity. In some embodiments, the system establishes the communication link system between the automobile and a third party entity device by utilizing transmitting devices in the automobile and the third party entity device. In some embodiments, wherein the current location of the user matches the location of the first third party entity, the system may utilize the NFC interface in the automobile and the third party entity device to establish the communication link.

As shown in block 570, the system identifies a trigger from a third party entity device (e.g., fuel dispenser or point of sale), wherein the trigger is associated with transfer of resources to complete an interaction (transaction associated with fuel purchase). The trigger may be a payment request from the point of sale device, wherein the trigger comprises a unique identifier associated with the fuel purchase of the user. The system connects to the third party entity device (point of sale) using NFC interface to identify a resource amount (purchase amount).

As shown in block 580, the system in response to identifying the trigger, initiates the transfer of resources to complete the interaction. The system selects a best resource pool information from one or more resource pools of the user based on the supplemental resources offered (rewards, perks, or the like). In some embodiments, the system accesses the resource pool information from the user application 224 (e.g., mobile wallet application or the like) in the smart computing device 200 connected to the automobile 300. In some embodiments, the system accesses the resource pool information from the memory of the automobile, wherein a system associated with the automobile, after identifying that the smart computing device is connected to the automobile 300 via wired or wireless technology, extracts the user resource pool information from the smart computing device 200 and stores it in the memory of the automobile 300. The system after identifying the best resource pool, authenticates the interaction i.e., transfer of resources by any forms of authentication methods. In one embodiment, the system verifies that one or more smart computing devices (mobile device, smart watch, or the like) of the user are within the proximity of the automobile and the third party entity device (point of sale). In another embodiment, the system may use facial recognition or finger printing or the like to authenticate the interaction. The system utilizes the wireless network of the automobile to transfer the best resource pool information to the third party entity device.

As shown in block 590, the system completes the interaction by transferring the resources to the third party entity device. The system transfers the resource amount from the identified best resource pool to the third party entity device. After completing the interaction, the third party entity device may transfer a receipt associated with the interaction to the automobile. At this time, the user need not wait at the third party entity location to receive the receipt. In an exemplary embodiment, after refueling the user may drive away from the third party entity location and the transfer of resources may be performed by the system without having the user to stay at the third party entity location. Similarly, the third party entity device may transfer a receipt while the user is not at the third party entity location. In some embodiments, the system may link or integrate the receipt into a user application or a financial institution application of the smart computing device 200. For example, upon completion of the transaction associated with the fuel purchase, the transaction may be posted into a resource pool (e.g., checking account) in the financial institution application (e.g., online application) on the mobile device 200. The system may integrate the receipt received from the third party entity device with the transaction posted in the resource pool via the financial institution application.

In some embodiments, the system may also transfer a second resource amount associated with the order placed before arriving at the third party entity location, thereby allowing the user to pick up the one or more products directly. In such embodiments, the system may utilize a card reader present in the automobile 300 to perform the interaction before arriving at the third party entity location. In some embodiments, the system after completion of transfer of second resource amount to the point of sale, receives a QR code or any other code from the third party entity device and transfers the received code to the one or more computing devices of the user. The user may provide this code at a pick-up location within the third party entity location to collect the one or more products of the order. In some embodiments, the system upon receiving an input from the user to search for Automated Teller Machines, may follow similar process to place an order at an Automated Teller Machine for withdrawing cash or the like and reserving the Automated Teller Machine for the user.

FIG. 6 presents a process flow 600 for completing an interaction associated with a parking location via the automobile. As shown in block 610, the system receives an input from the user, via the input devices of the automobile, to search for at least one available parking location. The input may be a voice command, a text command, and/or the like received from the user via the user input devices 315 of the automobile. The system instantly recognizes the input received from the user. In some embodiments, the system may identify current location of the user and based on the travel patterns may automatically identify that the user is searching for the at least one available parking location. In some embodiments, travel patterns may be stored in the memory of the automobile. In some embodiments, the travel patterns may be stored in the memory of the smart computing device. In other embodiments, the travel patterns may be stored in the memory of the system.

As shown in block 620, the system identifies a destination of the user. The system communicates with the navigation system of the automobile to identify the destination of the user. In alternate embodiments, the system may automatically identify the destination based on the travel patterns of the user. As shown in block 630, the system determines one or more parking locations located within a predetermined limit from the destination of the user. For example, the system may identify all parking locations within half a mile from the destination. As shown in block 640, the system communicates with one or more remote devices at the one or more parking locations to identify one or more available parking spaces. For example, the system communicates with parking meter monitoring systems to identify one or more available parking spaces within each of the one or more parking locations. Additionally, the system may also identify the exact location of each of the one or more available parking spaces.

As shown in block 650, the system applies logic to select a first parking space from the one or more available parking spaces.

FIG. 9 presents a process flow 900 for selecting a first third party entity from one or more third party entities associated with a parking location by applying logic via an artificial intelligence engine, in accordance with an embodiments of the present invention. As shown in block 910, the system identifies user preferences associated with the user. For example, the user may prefer a particular parking space, a particular parking location, a left side parking space, a right side parking space, a parking space with adjacent empty parking spaces, or the like. The user preferences may be stored in the memory of the smart computing device 200 or the memory of the automobile 300. The system retrieves user preference data and identifies that the user prefers parking space 'A' which is closer to elevator over parking space 'B' which is away from the elevator. In another case, the system retrieves user preference data and identifies that the user prefers going to parking location or parking entity 'A' over parking location or parking entity 'B'. As shown in block 920, the system identifies travel time associated with each of the one or more parking locations by communicating with traffic monitoring systems (not shown). For example, the system may identify that traffic associated with the travel route to go to parking location 'A' is less than the travel route associated with parking location 'B' of the one or more parking locations. Additionally, the system may also identify the travel distance to each of the identified one or more parking locations. As shown in block 930, the system identifies one or more supplemental resources associated with the resource pools of the user. Supplemental resources may be any of rewards, cashback, membership perks, or the like associated with any of the resource pools of the user. For example, the system may identify that resource pool 'A' has a cashback deal with merchant of the parking location 'A' of the one or more parking locations. In some embodiments, the system may access supplemental resource information associated with resource pools of the user by accessing the user application 224 or financial institution application 221 of the smart computing device 200. In some embodiments, the system may access supplemental resource information by communicating with entity system associated with the resource pools. As shown in block 940, the system identifies one or more factors received from the entities associated with the identified one or more parking locations. For example, after identifying the one or more available parking spots in the one or more parking locations in block 640, may notify the entities about a potential opportunity (purchase of a parking spot). The entities may send one or more offers to the system in response to receiving a notification with the potential opportunity. The system may identify the one or more offers and may identify that entity 'A' is offering parking space for a lower price compared with other entities of the entities associated with one or more parking locations. In some embodiments, wherein the price of the available parking spaces is fixed, the system may identify the entity offering the lowest prices by communicating with systems associated with the entities. Next, as shown in block 950, the system identifies one or more factors associated with the one or more available parking spaces at the one or more parking locations. For example, the system may identify that a parking space 'A' at parking location 'A' is closer to the elevator of all the one or more available parking spaces. Next, as shown in block 960, the system determines the first parking space from the one or more available parking spaces by applying logic based on the user preferences, travel time, the one or more supplemental resources, and the one or more offers received from the entities, and the one or more factors. The system may apply logic based on the current traffic near each of the one or more parking locations, distance between the elevator or stairs and the exact location of each of the one or more available parking spaces, pricing of the one or more available parking spaces, offers associated with the one or more available parking spaces, user preferences, one or more to-do lists, and/or the like. For example, the system may access one or more to-do lists of the user stored in the smart computing device (smart watch, mobile device, or the like) of the user and may identify that the user has "pick up clothes from dry cleaners" listed in the to-do list of the user and the system considers a parking space available closer to the dry cleaners.

As shown in block 660, the system transmits a location of the first parking space to the user via the output devices of the automobile. The system automatically adds the location of the first parking space as the destination, via the navigational system of the automobile. In some embodiments, the system may add the location to the destination after receiving an approval from the user. The system upon adding the location to the destination, communicates with remote devices (parking meter monitoring system) associated with the first parking space to reserve the first parking space for the user.

As shown in block 670, the system identifies that the automobile of the user is at the location of the first parking space by continuously monitoring the current location of the user. The system identifies that the user has reached the parking space by identifying the current location of the user. After identifying that the user has reached the location of the first parking space, the system establishes a communication link between the automobile system and a first remote device (parking system, parking meter, or the like). In some embodiments, the system may establish the communication link between the automobile system and the first remote device when the current location of the user does not exactly match the location of the first parking space. In such an embodiment, the system allows the user to block the first parking space via the communication link between the automobile system and the first remote device. In one embodiment, wherein blocking the first parking space is not allowed, the system continuously monitors the first parking space. The system may identify that the first parking space is no longer available and may choose a second parking space by applying logic as explained in process flow 900. As shown in block 680, the system initiates a transfer of resources to the first remote device associated with the first parking space. The system selects a best resource pool information from one or more resource pools of the user based on the supplemental resources offered (rewards, perks, or the like). The system after identifying the best resource pool, authenticates the interaction i.e., transfer of resources by any forms of authentication methods. In one embodiment, the system verifies that one or more smart computing devices (mobile device, smart watch, or the like) of the user are within the proximity of the automobile and the first parking space. In another embodiment, the system may use facial recognition or finger printing or the like to authenticate the interaction.

In an exemplary embodiment, a parking meter may not be available on every floor at all parking locations. The system connects with the parking meters remotely after identifying that the automobile of the user is at the location of the first parking space and initiates transfer of resources (parking payment) to the parking meter located on another floor at the parking location. As shown in block 690, the system completes the transfer of resources to the first remote device and notifies the user. In some embodiments, the system may utilize the chip reader in the automobile for completing the interaction. After completion of transfer of resources, the system may receive a receipt from the remote device i.e., the parking meter. The system may automatically save the receipt in the memory of automobile, smart chip, and/or the smart computing devices of the user. In some embodiments, the system may link or integrate the receipt into a user application or a financial institution application of the smart computing device 200. For example, upon completion of the transaction associated with the first parking space, the transaction may be posted into a resource pool (e.g., checking account) financial institution application (e.g., online application) on the mobile device 200. The system may integrate the receipt received from the first remote device with the transaction posted in the resource pool via the financial institution application. In some embodiments, the system receives the receipt immediately upon completion of the interaction.

In some embodiments, the pricing associated with the first parking space may be hourly pricing. In such embodiments, the system may identify a resource amount associated with the first parking space when the user is leaving the location associated with the first parking space. The system may utilize the communication link established between the automobile system and the first remote device to transfer the resource amount to the first remote device. In some embodiments, the transfer of resources may occur when the real-time location of the user does not match the location of the first parking space, thereby allowing the user to pay without having to wait the parking location or the first parking space.

FIG. 7 presents a process flow 700 for communicating an order to a remote device of a third party entity via the automobile. As shown in block 710, the system receives a request from the user, via the input devices of the automobile, to place an order. The order may be a fast food order, a prescription refill order or the like which involves picking up one or more products associated with the order at a drive-through. The order may be received as an input from the user. The input may be a voice command, a text command, and/or the like received from the user via the user input devices 315 of the automobile.

In an exemplary embodiment, the system, after receiving a fast food order from the user, calculates the number of calories associated with the fast food order. The system may access a fitness tracking application in the smart computing device of the user and may identify that the calculated calories in the current order of fast food may cross the limit of daily calorie intake of the user. The system may then suggest alternative fast foods with less calories to the user and prompts the user to identify if he/she would like to switch the order. Based on the user input, the system finalizes the order and may look for one or more third party entities providing one or more products in the finalized order. Additionally, the system may also communicate with a budgeting application of the smart computing device 200 and may alert the user of spending goals. For example, the system may identify that the prices of the current order may exceed the spending goals set by the user and may notify the user via the output devices of the automobile 300.

As shown in block 720, the system identifies current location of the user. The system communicates with the positioning system device 325 to identify the current location of the user. In some embodiments, the system may use satellite data to determine the location of the user. Additionally, the system may also identify a destination, via the navigation system of the automobile 300. As shown in block 730, the system identifies one or more third party entities associated with the order within a predetermined limit from the current location of the user. For example, the system identifies one or more third parties within five miles from the current location of the user. In some embodiments, the predetermined limit may be fixed. In some embodiments, the predetermined limit may be dynamic. For example, the system may choose the predetermined limit based on a time estimate for the order to be ready. In some embodiments, the system may estimate a time required to prepare one or more products associated with the order based on time of the day. For example, if the order is a fast food order and the user sends a request to place an order during lunch hour, the system may estimate that the order may take more amount of time than the usual time taken to prepare one or more products. In other words, the system intelligently identifies the predetermined limit, therefore allowing the user to pick up the order at a drive-through without having to wait for the order. The system identifies one or more third parties between the current location and destination and along the travel route selected by the user, that are offering the one or more products associated with the request.

As shown in block 740, the system selects a first third party entity from the one or more third party entities and transfers a third party entity location of the first third party entity to the user. The system, via the artificial intelligence engine, applies logic to select the first third party by considering one or more factors such as rating of the one or more third party entities, user preferences, supplemental resources associated with the one or more third party entities, current traffic, detour distance, or the like. As shown in block 750, the system establishes a communication link between the automobile system and a remote device (online ordering platform) associated with the first third party entity. The system communicates with the remote device to open a new order ticket.

As shown in block 760, the system prompts the user to confirm the order, via the output devices of the automobile. For example, the system may read the order to the user via the speaker. In some embodiments, when the order is a fast food order, the system identify that the user ordered additional condiments in a previous order similar to the present order based on the past ordering history. The system may also read out the additional condiments placed in the previous order to the user and may prompt the user to confirm the additional condiments to be requested along with the order.

As shown in block 770, the system in response to receiving a confirmation from the user, via the input devices of the automobile, communicates the order to the remote device. The system may add the one or more products and additional condiments to the new ticket opened by the system by communicating with the remote device. The system may additionally calculate estimated arrival time of the user based on the traffic, current location, driving patterns, or the like and may communicate the calculated estimated arrival time of the user to the remote device.

As shown in block 780, the system receives a notification associated with the order from the remote device. The notification may include an resource amount i.e., total cost of the order, order confirmation, a confirmation code (e.g., QR code), drive-through slot number, order status tracking link, or the like. The system may then automatically initiate transfer of resources to the remote device the wireless network of the automobile to the remote device. In some embodiments, the system may utilize the chip reader in the automobile to transfer the resources directly to the remote device via the communication link established between the automobile system and the remote device. In some embodiments, the system may cause the financial institution application (e.g., online banking application) or user application (e.g., digital wallet) on the smart computing device to transfer the resources to the remote device. In one such embodiment, the system may utilize the card reader to transfer the resources. In alternate embodiments, as shown in block 790, the system identifies that the automobile of the user is at the third party entity location and initiates transfer of resources via the NFC interface to a third party entity device located at the third party entity location. For example, the system may identify that the user is at the drive-through slot number associated with the user and may establish a communication link via the NFC interface of the automobile with a point of sale device at the drive-through slot and may communicate the confirmation code to the point of sale device. The system may access the user application (e.g., digital wallet application) and choose a best resource pool from the one or more resource pools associated with the user may transfer the resources associated with the resource amount from the best resource pool to the point of sale device. In some embodiments, in response to transferring the resources, the third party entity device may transmit a receipt to the user. The system may then integrate the receipt with a corresponding transaction posted in the resource pool of the user via the financial institution application or user application in the smart computing device 200.

FIG. 8 presents a process flow 800 for process flow for completing an interaction associated with one or more tolls by communicating with remote devices at toll booths via the automobile. As shown in block 810, the system receives a travel route to a destination from the user, via the input devices of the automobile. The user may input a destination into the navigation system of the automobile and select a travel route associated with the destination. The system identifies that the user selected the travel route. In some embodiments, the system may automatically select a best travel route based on the traffic conditions, road closure, and/or the like. As shown in block 820, the system identifies one or more tolls associated with the travel route. In some embodiments, the system may identify one or more tolls by communicating with navigation systems of the automobile. In some embodiments, the system may identify the one or more tolls by communicating with remote navigation systems. Alternatively, the system may identify one or more tolls by communicating with user application (navigation application) of the mobile device.

As shown in block 830, the system continuously monitors a current location of the user. In some embodiments, the system monitors the current location of the user via the positioning system device 325 of the automobile 300. In alternate embodiments, the system monitors the current location of the user via the positioning system device 275 of the smart computing device 200. Additionally, the system may also current traffic conditions along the travel route by communicating with the traffic monitoring systems.

As shown in block 840, the system identifies that the current location of the user is within a predetermined distance from a toll location of the one or more tolls. In some embodiments, the predetermined distance may be set by the user. For example, the system identifies that the current location is two miles away from the next toll booth in the travel route. In some embodiments, the system based on the current traffic conditions and calculates a new predetermined distance based on the current traffic conditions. For example, if the travel time to the next toll booth is thirty minutes and the travel distance is two miles, the system calculates a new predetermined limit which may be quarter mile from the next toll booth. Therefore, by calculating the new predetermined limit, the system may avoid paying for unnecessary tolls in instances when there is a traffic diversion.

As shown in block 850, the system establishes a communication link between the automobile system and at least one remote device such as online toll payment platform associated with the toll location. For example, the system establishes a communication link and the wireless network of the automobile. The system, via the communication link identifies a resource amount associated with the toll. Alternatively, in some embodiments, the system may identify the resource amount by communicating with any toll calculator systems. In some embodiments, the system may identify the resource amount by communicating with user applications (toll calculator) in the smart computing device 200.

As shown in block 860, the system initiates transfer of resources to the at least one remote device. The system selects a best resource pool information from one or more resource pools of the user based on the supplemental resources offered (rewards, perks, or the like). The system after identifying the best resource pool, transfers the resource associated with the resource amount to the at least one remote device. As shown in block 870, the system completes the transfer of resources. In some embodiments, the system utilizes the chip reader in the automobile to complete the transfer of resources.

As shown in block 880, the system receives a notification from the remote device. The notification may include a payment confirmation, a toll lane number, or the like. As shown in block 890, the system transfers the notification to the user via the output devices of the automobile. For example, the system may read the toll lane number associated with the notification received from the at least one remote device via the speaker of the automobile. Additionally, the system may also receive a receipt associated with the interaction from the remote device. The system may integrate the receipt with the interaction posted to the resource pools via the financial institution application or user application in the smart computing device.

FIG. 10 depicts a method 1000 of providing real-time routing and data services for user events based on real-time vehicle location. The steps of the method 1000 are described herein as being performed by the resource distribution triggering system 400, but it is within the scope of the present invention for the steps of the method 1000 to be performed by other systems and/or devices described herein.

Initially, at block 1005, the resource distribution triggering system 400 identifies an event of the user. The event is typically an entertainment event, such as a sporting event or concert.

In some embodiments, the system 400 identifies the event by monitoring one or more electronic accounts of the user, such as an email account, social media account, and/or electronic calendar account. In this regard, the user may grant the system 400 with access to the user's electronic accounts by providing the system 400 with the user's credentials for accessing such electronic accounts. Thereafter, the system 400 may monitor (e.g., continuously or periodically) such electronic accounts to identify events of the user. For example, the system 400 may identify electronic message that relate to the purchase of tickets to an event or that include an invitation to an event. The system 400 may also identify entries in an electronic calendar that relate to an event. The system 400 may search the header, subject line and/or titles of electronic messages and/or calendar entries for key words (e.g., "purchase", "order", "ticket", "receipt", "invitation", and the like) that may relate to an event. If the system 400 determines from this initial analysis that an electronic message or calendar entry may relate to an event, then system 400 then typically accesses the body of such electronic message or calendar entry to confirm that such electronic message or calendar entry relates to an event. In addition, the system 400 typically parses the electronic message or calendar entry to extract event information (e.g., date and time of the event, name of the event venue, location of the event, ticket information, parking information, information about a parking pass of the user, and the like). Because the text contained in email message or calendar entry bodies is often unstructured (as opposed to the structured tagged elements in a hypertext markup language (HTML) web page which delineate and make recognizable the various fields or elements of the web page), event information may be converted from an unstructured to a structured format. In one embodiment, predefined templates are used that have been specifically created to identify the various individual data elements of interest in a given email from an event provider. In some embodiments, context-free grammars "CFGs" are used for parsing relevant event information. In some embodiments, instead of using grammars for parsing natural language (e.g., English) structures, the system 400 may use defined smaller grammars describing a particular message format, for example: "(Greetings from event provider)(Details about order)(Details about event)(Tax and totals calculation)," and the like. Further, the CFGs may be individually defined, such as in a Backus-Naur Form (BNF) format, or templates may be used for data extraction. In instances, where templates are used, these created templates are grammar and can be converted by known tools, such as Another Tool for Language Recognition "ANTLR", into email-specific grammars. ANTLR is then used again to convert these grammars into extraction parsers, which can be used by the system 400 to parse the email message bodies, calendar entries, etc. to extract the data elements of interest from them. Other extraction parsers may be used, such as regular expression extraction, which can be used as a brute force pattern matching approach. With this technique, each word in a given email or calendar entry is matched against a set of rules. If the rules are met, the piece of text matching the set of rules is returned. In another embodiment, an HTML document object model (DOM) approach may be used to parse event information. For example, the message body of an email may contain HTML code with tags for order and event information. The system 400 may use these tags to identify event information for extraction. Once the event information has been extracted and converted to a structured format, the structured event information is typically stored in a database in communication with the system 400.

In other embodiments, rather than monitoring the user's electronic accounts to identify the event, the user may specify the event and provide information about the event to the system 400.

At block 1010, the system 400 identifies a location of the event. As noted above, the event information extracted by the system 400 may include information about the location of the event. In other embodiments, the user may identify the location of the event to the system 400. However, if the system 400 does not yet possess the location of the event, the system 400 may determine the location of the event. In this regard, the system 400 may prompt the user (e.g., via a mobile phone of the user or smart device of a vehicle) to provide a location of the event. Alternatively, the system 400 may search publicly available information about the event (e.g., using a name and date of the event) to identify the location (e.g., address or GPS coordinates) of the event.

At block 1015, the system 400 identifies a location of a mobile device (e.g., smartphone or tablet computer) of the user. As noted above, the mobile device of the user may have a positioning system, such as a GPS transceiver. Accordingly, the system 400 may communicate with the mobile device to obtain the location (e.g., GPS coordinates) of the mobile device.

At block 1020, the system 400 identifies a location of a vehicle (e.g., the automobile system 300) of the user. As noted above, the vehicle of the user may have a positioning system, such as a GPS transceiver. Accordingly, the system 400 may communicate with the vehicle to obtain the location (e.g., GPS coordinates) of the vehicle.

At block 1025, the system 400 determines that the mobile device and vehicle of the user are collocated. The system 400 may determine that the mobile device and vehicle are collocated if the mobile device and the vehicle have the same GPS coordinates. The system 400 may determine that the mobile device and vehicle are collocated if the mobile device and the vehicle are within a predetermined distance (e.g., within a few feet) of one another. In another embodiment, the system 400 may determine that the mobile device and vehicle are collocated if the mobile device and smart device of the vehicle are in communication with one another, such as via a NFC or Bluetooth connection.

At block 1030, the system 400 determines that the user has initiated travel to the event. This determination may be based on a number of factors. This determination is typically based in part on determining that the mobile device and vehicle of the user are collocated. If the mobile device and vehicle of the user are not collocated, then the system 400 may assume that the user is not yet traveling to the event. In some embodiments, the user may indicate to the system (e.g., via the user's mobile device or smart device of the vehicle) that the user has begun travel to the event. In some embodiments, based on various factors, such as the start time of the event, current time, travel time to the event, determining that the user is located in the vehicle (e.g., based on collocation of the vehicle and mobile device), current location of the user, and the vehicle's current travel bearing, the system 400 may determine that the user is traveling to the event. For example, the system 400 may determine that the user has begun traveling to the event if the user's mobile device is collocated with the vehicle, and the vehicle is traveling in the general direction of the event. In some embodiments, the system 400 may prompt the user (e.g., via a graphical user interface displayed on the user's mobile device or vehicle smart device) to confirm that the user has begun travel to the event.

In some embodiments, the system 400 may be configured to remind the user of the event. Such a reminder may be sent to the user based on various factors, such as the start time of the event, current time, travel time to the event, and current location of the user or vehicle. For example, if the event begin in two hours, but the user has not yet begun travel to the event, the system 400 may cause the user's mobile device or smart device of the vehicle to display a reminder regarding the event.

At block 1035, the system 400 determines a travel route to the event (e.g., based on the current location of the vehicle and the location of the event). In some embodiments, the system may automatically determine a best travel route based on the traffic conditions, road closures, and/or the like. In other embodiments, the system may determine multiple travel routes and then prompt the user to select (e.g., via the user's mobile device or smart device of the vehicle) the user's preferred travel route.

At block 1040, the system 400 transmits a command to the smart device of the vehicle that causes a display of the smart device to display the determined travel route. This step typically occurs in response to determining that the user has initiated travel to the event.

At block 1045, the system 400 determines a parking location proximate to the location of the event. In some embodiments, the user may have purchased a parking pass, and the system 400 may therefore determine the location corresponding to the parking pass. In other embodiments, the system 400 may identify one or more parking lots operated by the third party entity running the event. In other embodiments, the system 400 may identify one or more parking lots/spaces located proximate (e.g., within a predefined distance) to the location of the event that are not operated by the third party entity running the event. If the user does not yet have a parking pass, the system 400 may automatically select the parking location based on various factors (e.g., cost, distance from the event, and the like) or may prompt the user to select the parking location (e.g., via a GUI displayed on the smart device of the automobile). In some embodiments, the system 400 may identify a parking location as described above with respect to the process flows of FIGS. 6 and 9.

At block 1050, the system 400 typically modifies the determined travel route to include the parking location. For example, the destination of the travel route may be changed from the address of the event venue to coordinates associated with the determined parking location.

At block 1055, the system 400 transmits a command to the smart device of the vehicle that causes a display of the smart device to display the modified travel route. This step typically occurs in response to modify the travel route.

At block 1060, the system 400 identifies one or more items of a third party entity located proximate to the event. This step may occur while the user is traveling in the vehicle to the event. The one or more items are typically items that the user may be interested in purchasing while the user is at the event. In some embodiments, the one or more items include food and/or beverage items. In further embodiments, the one or more items include merchandise for sale at the event. In some embodiments, the one or more items are identified based on preferences of the user. In this regard, the system 400 may maintain a user summary of the user, and the user may have updated such summary to include information regarding the user's preferences regarding merchandise and/or food and beverage items. In some embodiments, the one or more items are identified based on the user's purchase history. For example, the user may have a history of purchasing certain types of merchandise at similar events. By way of further example, the system 400 may determine that the user has an interest in certain types of food items based on the restaurants that the user frequents. The third party entity providing the one or more items may be the third party entity operating the event. In other embodiments, the third party entity providing the one or more items is not the third party entity operating the event but instead may be a merchant with a location at the event. In yet other embodiments, the third party entity providing the one or more items is not located at the location of the event, but instead may be a merchant located proximate to the event. For example, the third party entity providing the one or more items may be a merchant with a location adjacent to the location of the event.

At block 1065, the system 400 determines that a trigger event has occurred. In some embodiments, the trigger event is the vehicle being a predefined distance from the location of the event and/or location of the parking location. In other embodiments, the trigger event is the remaining travel time on the travel route being below a defined threshold. In yet another embodiment, the system 400 may be configured to display (e.g., via a GUI displayed on the smart device of the vehicle or the mobile device of the user) to the user the one or more identified items. Accordingly, the trigger event may be the user confirming (e.g., via a GUI displayed on the smart device of the vehicle or the mobile device of the user) that the user wishes to place an order for the one or more identified items.

In response to determining that the trigger event has occurred, at block 1070, the system 400 places an order for the one or more items. In this regard, the system 400 may communicate the order for the one or more items to an online ordering platform or to a remote device, such as a point-of-sale device, operated by the third party entity. Once the order has been placed, the system 400 may provide information about the order (e.g., cost, items, location of the third party entity, pick-up time, and the like) to the user via the smart device of the vehicle (e.g., while the vehicle is traveling to the parking location).

In some embodiments, the system 400 may be configured to provide the user with other information about the event (e.g., a map of the event, a schedule of activities occurring during the event, information about items that may be purchase during the event, statistics about the event, and the like. This information may be provided to the user via the user's mobile device or the smart device of the vehicle before the user has begun traveling to the event, while the user is traveling to the event, or once the user has arrived at the event.

At block 1075, the system 400 determines that (i) the vehicle has arrived at the parking location and (ii) the user is no longer collocated with the vehicle. The system 400 may determine that the vehicle has arrived at the parking location if the vehicle and the parking location have the same GPS coordinates or if the vehicle and the parking location are within a predetermined distance (e.g., within a few feet) of one another. The system 400 may determine that the user is no longer collocated with the vehicle if the user's mobile device is at least a predefined distance (e.g., at least twenty-five feet) away from the location of the vehicle. In another embodiment, the system 400 may determine that the user is no longer collocated with the vehicle by determining that mobile device and the vehicle are no longer in communication with one another, such as via a NFC or Bluetooth connection. By determining that (i) the vehicle has arrived at the parking location and (ii) the user is no longer collocated with the vehicle, the system 400 is able to determine that the user has parked the vehicle and left the vehicle to enter the event.

At block 1080, the system 400 transmits a command to the mobile device of the user, the command being configured to cause a display of the mobile device to display information about the order (e.g., cost, items, location of the third party entity within the event location, pick-up time, and the like). Accordingly, information that was previously displayed to the user via the smart device of the vehicle may now be automatically displayed to the user via the user's mobile device.

At block 1085, the systems 400 determines that the mobile device of the user is collocated with a remote device of the third party entity (i.e., the third party entity through which the order was placed). The remote device of the third party entity may be a point-of-sale device. The system 400 may determine that the mobile device of the user is collocated with a remote device of the third party entity if the mobile device and the remote device have the same GPS coordinates or if mobile device and the remote device are within a predetermined distance (e.g., within a few feet) of one another. In another embodiment, the system 400 may determine that the mobile device and the remote device are collocated if the mobile device and remote device are in communication with one another, such as via a NFC or Bluetooth connection.

In response to determining that the mobile device of the user is collocated with the remote device of the third party entity, at block 1090, the system 400 transfers resources from the user (e.g., from an account of the user) to the third party entity (e.g., to an account of the third party entity) to complete the order. In some embodiments, the system 400 may transfer the resources (e.g., via a digital wallet stored on the mobile device) through a connection (e.g. NFC connection) established between the mobile device and the remote device of the third party entity. Once the order has been completed, the third party entity typically provides the one or more items to the user.

As evident from the preceding description, the system described herein represents an improvement in technology in that the system is able to automatically identify events of a user, route the user to the event, and order items for the user, each without requiring interaction by the user. Automating these tasks facilitates safe travel to the event in the vehicle and provides added convenience to the user. Moreover, once the system determines that the user has parked and left the user's vehicle, the system automatically causes the user's mobile device to display order information, thereby providing a smooth transition between displaying information on the smart device of the vehicle to displaying such information on the user's mobile device. Moreover, displaying such information on the mobile device may help the user locate the third party entity though which the user has placed the order.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing real-time routing and data services for user events based on real-time vehicle location, comprising:
   one or more computer processors;
   a memory;
   a network communication device; and
   a software module stored in the memory, executable by the one or more computer processors, and configured to perform the steps of:
   identifying an event of a user;
   identifying a location of the event;
   determining a location of a mobile device of the user;
   determining a location of a vehicle of the user;
   determining that the mobile device and vehicle of the user are collocated;
   in response to determining that the mobile device and vehicle of the user are collocated, determining that the user has initiated travel to the event via the vehicle;
   determining a travel route to the event;
   in response to determining that the user has initiated travel to the event via the vehicle, transmitting a command to a smart device of the vehicle, the command being configured to cause a display of the smart device to display the travel route;
   determining a parking location proximate to the location of the event;
   modifying the travel route to include the parking location;
   in response to modifying the travel route, transmitting a second command to the smart device of the vehicle, the second command being configured to cause the display of the smart device to display the modified travel route;
   identifying one or more items of a third party entity located proximate to the location of the event;
   determining that a trigger event has occurred;
   in response to determining that the trigger event has occurred, placing an order for the one or more items;
   determining that (i) the vehicle has arrived at the parking location and (ii) the user is no longer collocated with the vehicle;
   in response to determining that (i) the vehicle has arrived at the parking location and (ii) the user is no longer collocated with the vehicle, transmitting a third command to the mobile device of the user, the third command being configured to cause a display of the mobile device to display information about the order;

determining that the mobile device of the user is collocated with a remote device of the third party entity; and in response to determining that the mobile device of the user is collocated with the remote device of the third party entity, transferring resources from the user to the third party entity to complete the order.

2. The system according to claim 1, wherein identifying the event of the user comprises:
monitoring an electronic account of a user, wherein the electronic account is an email account or an electronic calendar account;
identifying one or more electronic messages and/or calendar entries of the electronic account; and
parsing the one or more electronic messages and/or calendar entries of the electronic account to identify the event.

3. The system according to claim 2, wherein identifying the location of the event comprises extracting the location of the event from the one or more electronic messages and/or calendar entries of the electronic account.

4. The system according to claim 1, wherein determining that the mobile device and vehicle of the user are collocated comprising determining that the mobile device and the smart device of the vehicle have established a communication connection.

5. The system according to claim 4, wherein determining the user is no longer collocated with the vehicle comprises determining that the communication connection has been terminated.

6. The system according to claim 1, wherein the software module is configured to perform the step of causing the display of the smart device to display an event reminder based on the location of the vehicle, a current time, and a start time of the event.

7. The system according to claim 1, wherein the software module is configured to perform the step of causing the display of the smart device to display the information about the order information once the order has been placed and while the vehicle is traveling to the parking location.

8. The system according to claim 1, wherein determining that the trigger event has occurred comprises determining that the vehicle is within a predefined distance of the parking location of the event.

9. The system according to claim 1, wherein determining that the trigger event has occurred comprises determining that a remaining travel time to the parking location is below a predefined threshold.

10. The system according to claim 1, wherein determining that the mobile device of the user is collocated with the remote device of the third party entity comprises determining that the mobile device and the remote device have established a communication connection.

11. The system according to claim 1, wherein the event is an entertainment event.

12. A computer program product for providing real-time routing and data services for user events based on real-time vehicle location, the computer program product comprising a non-transitory computer-readable storage medium having computer-executable instructions for causing a computer processor to perform the steps of:
identifying an event of a user;
identifying a location of the event;
determining a location of a mobile device of the user;
determining a location of a vehicle of the user;
determining that the mobile device and vehicle of the user are collocated;

in response to determining that the mobile device and vehicle of the user are collocated, determining that the user has initiated travel to the event via the vehicle;
determining a travel route to the event;
in response to determining that the user has initiated travel to the event via the vehicle, transmitting a command to a smart device of the vehicle, the command being configured to cause a display of the smart device to display the travel route;
determining a parking location proximate to the location of the event;
modifying the travel route to include the parking location;
in response to modifying the travel route, transmitting a second command to the smart device of the vehicle, the second command being configured to cause the display of the smart device to display the modified travel route;
identifying one or more items of a third party entity located proximate to the location of the event;
determining that a trigger event has occurred;
in response to determining that the trigger event has occurred, placing an order for the one or more items;
determining that (i) the vehicle has arrived at the parking location and (ii) the user is no longer collocated with the vehicle;
in response to determining that (i) the vehicle has arrived at the parking location and (ii) the user is no longer collocated with the vehicle, transmitting a third command to the mobile device of the user, the third command being configured to cause a display of the mobile device to display information about the order;
determining that the mobile device of the user is collocated with a remote device of the third party entity; and
in response to determining that the mobile device of the user is collocated with the remote device of the third party entity, transferring resources from the user to the third party entity to complete the order.

13. The computer program product according to claim 12, wherein identifying the event of the user comprises:
monitoring an electronic account of a user, wherein the electronic account is an email account or an electronic calendar account;
identifying one or more electronic messages and/or calendar entries of the electronic account; and
parsing the one or more electronic messages and/or calendar entries of the electronic account to identify the event.

14. The computer program product according to claim 13, wherein identifying the location of the event comprises extracting the location of the event from the one or more electronic messages and/or calendar entries of the electronic account.

15. The computer program product according to claim 12, wherein determining that the mobile device and vehicle of the user are collocated comprising determining that the mobile device and the smart device of the vehicle have established a communication connection.

16. The computer program product according to claim 15, wherein determining the user is no longer collocated with the vehicle comprises determining that the communication connection has been terminated.

17. The computer program product according to claim 12, wherein determining that the trigger event has occurred comprises determining that the vehicle is within a predefined distance of the parking location of the event.

18. The computer program product according to claim 12, wherein determining that the trigger event has occurred comprises determining that a remaining travel time to the parking location is below a predefined threshold.

19. The computer program product according to claim 12, wherein determining that the mobile device of the user is collocated with the remote device of the third party entity comprises determining that the mobile device and the remote device have established a communication connection.

20. A computerized method of providing real-time routing and data services for user events based on real-time vehicle location, comprising:

identifying, via a computer processor, an event of a user;

identifying, via a computer processor, a location of the event;

determining, via a computer processor, a location of a mobile device of the user;

determining, via a computer processor, a location of a vehicle of the user;

determining, via a computer processor, that the mobile device and vehicle of the user are collocated;

in response to determining that the mobile device and vehicle of the user are collocated, determining, via a computer processor, that the user has initiated travel to the event via the vehicle;

determining, via a computer processor, a travel route to the event;

in response to determining that the user has initiated travel to the event via the vehicle, transmitting, via a computer processor, a command to a smart device of the vehicle, the command being configured to cause a display of the smart device to display the travel route;

determining, via a computer processor, a parking location proximate to the location of the event;

modifying, via a computer processor, the travel route to include the parking location;

in response to modifying the travel route, transmitting, via a computer processor, a second command to the smart device of the vehicle, the second command being configured to cause the display of the smart device to display the modified travel route;

identifying, via a computer processor, one or more items of a third party entity located proximate to the location of the event;

determining, via a computer processor, that a trigger event has occurred;

in response to determining that the trigger event has occurred, placing, via a computer processor, an order for the one or more items;

determining, via a computer processor, that (i) the vehicle has arrived at the parking location and (ii) the user is no longer collocated with the vehicle;

in response to determining that (i) the vehicle has arrived at the parking location and (ii) the user is no longer collocated with the vehicle, transmitting, via a computer processor, a third command to the mobile device of the user, the third command being configured to cause a display of the mobile device to display information about the order;

determining, via a computer processor, that the mobile device of the user is collocated with a remote device of the third party entity; and in response to determining that the mobile device of the user is collocated with the remote device of the third party entity, transferring, via a computer processor, resources from the user to the third party entity to complete the order.

\* \* \* \* \*